United States Patent [19]

Yamamori

[11] Patent Number: 4,837,784
[45] Date of Patent: Jun. 6, 1989

[54] APPARATUS FOR ADAPTING THE DIAMETER OF A DISK-LIKE RECORDING MEDIUM

[75] Inventor: Eiji Yamamori, Tokyo, Japan

[73] Assignee: Sony Corporation, Tokyo, Japan

[21] Appl. No.: 162,203

[22] Filed: Feb. 29, 1988

[30] Foreign Application Priority Data

| Mar. 14, 1987 | [JP] | Japan | 62-59668 |
| Mar. 14, 1987 | [JP] | Japan | 62-59669 |
| Mar. 14, 1987 | [JP] | Japan | 62-59670 |
| Nov. 30, 1987 | [JP] | Japan | 62-302060 |

[51] Int. Cl.$^4$ .................... G11B 23/00; G11B 25/04
[52] U.S. Cl. .................... 369/289; 309/291; 309/292
[58] Field of Search ............... 369/270, 271, 272, 277, 369/289, 290, 291, 292; 360/133

[56] References Cited

U.S. PATENT DOCUMENTS

| 1,683,440 | 9/1928 | Bodwell et al. | 369/291 |
| 2,285,139 | 6/1942 | Andres | 369/289 |
| 3,801,110 | 4/1974 | Licitis | 369/277 |
| 4,076,256 | 2/1978 | Watanabe | 369/280 |

*Primary Examiner*—Steven L. Stephan
*Attorney, Agent, or Firm*—Lewis H. Eslinger; Jay H. Maioli

[57] ABSTRACT

Described is an apparatus for adapting the diameter of the disk-like recording medium. The apparatus includes a supporting member in the form of a ring having an opening for exposing the signal record area of the disk-like recording medium, such as an optical disk, to the outside, and having a diameter larger than the diameter of the disk-like recording medium. The recording medium is integrally retained by a holding system provided to the supporting member for holding the outer perimeter of the recording medium.

15 Claims, 24 Drawing Sheets

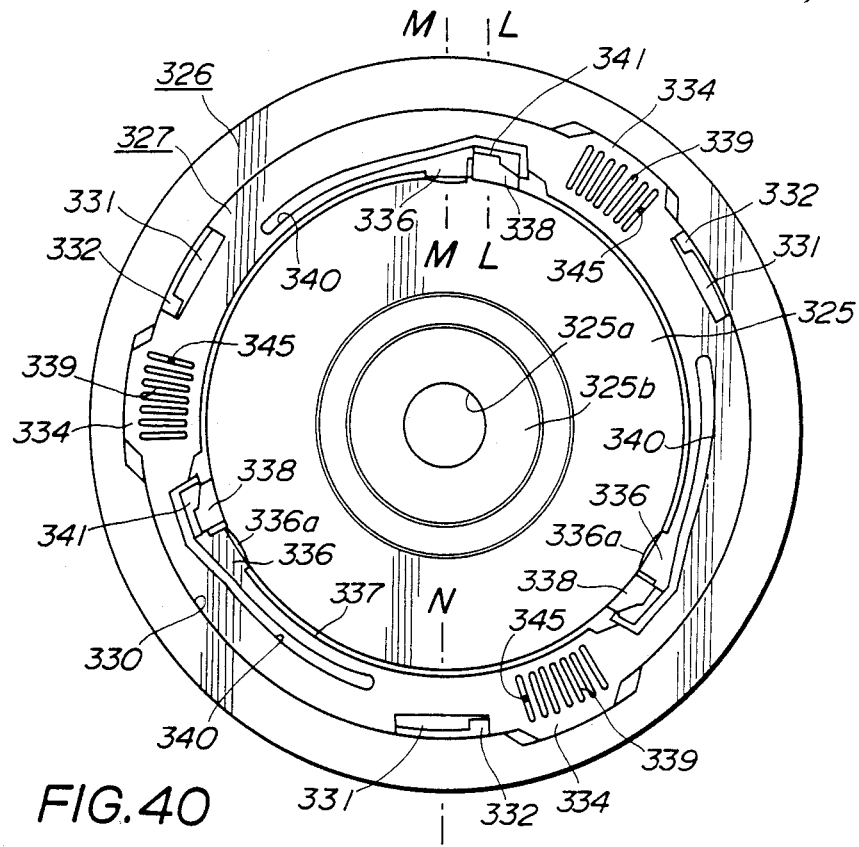
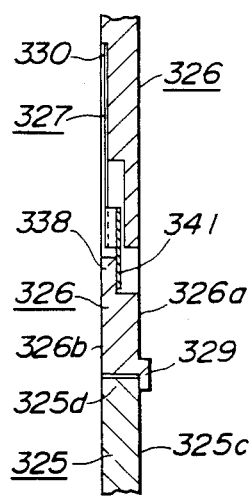 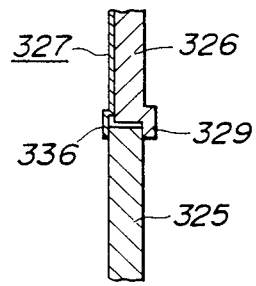 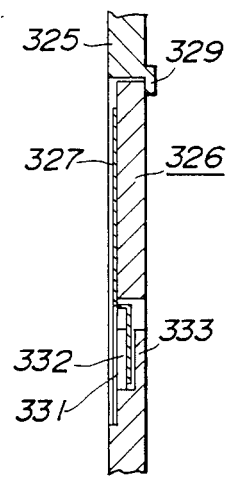
FIG.40
FIG.41   FIG.42   FIG.43

APPARATUS FOR ADAPTING THE DIAMETER OF A DISK-LIKE RECORDING MEDIUM

BACKGROUND OF THE INVENTION

1. Field of the Invention

This invention relates to an apparatus for adapting the diameter of a disk-like recording medium, such as an optical disk, opto-magnetic disk or a magnetic disk, wherein the recording medium is held on the inner periphery of a holder to permit the diameter of the disk-like recording medium to functionally assume the outside diameter of the holder.

2. Prior Art

An optical disk player has been employed in which prescribed information signals recorded on an optical recording medium are read and reproduced by contactless scanning by an optical pickup device adapted for signal reading.

In the above type disk player, the optical disk has only its central non-signal record area clamped by a disk table of a disk driving unit and clamping members securely pressured to the disk supporting side of the disk table. The optical disk is made as one with the disk table and caused to be revolved in unison therewith with the signal record area thereof facing to the optical pickup device.

In the above described disk player having the disk drive unit and the contactless optical pickup device, it is necessary that the disk drive unit mounting the optical disk and the optical pickup device be accurately positioned relative to each other for achieving accurate reading and reproduction of the information signals from the optical disk. Thus, in this type of the disk player, the disk drive unit is supported with accurate positioning by a chassis base plate provided in the main body of the player, while the optical pickup unit is slidably supported on a guide shaft mounted with accurate positioning to the chassis base plate.

Thus the disk loading device in which the optical disk employed in the above disk player is automatically mounted to the disk drive unit is so arranged as to transport only the optical disk for attachment thereof to the disk drive unit.

There is so far known a disk player having a disk loading device such as shown in the Japanese Laid-open Utility Model Application No. 145367/1986 or in the Japanese Laid-open Patent Publication No. 231966/1985.

In the disk player as shown in the Japanese Laid-open Utility Model Publication No. 145367/1986, a disk transfer table 3 on which rests an optical disk 2 is mounted so as to be movable into and out of a main body of the player 1, see FIG. 1. The disk transfer table 3 is transferred into the interior of the main body of the player 1 in the direction shown by the arrow mark a in FIG. 2 by a driving gearing 5 actuated by a driving motor 4 until the optical disk 2 held in an annular recess 6 formed on the table 3 is at a position confronting a disk table 9 of a disk drive unit 8 supported on a chassis base plate 7 within the main body of the player 1, see FIG. 3. A disk supporting member 3a projecting vertically movably from the bottom surface of the annular recess 6 for supporting the optical disk 2 may be actuated so that the optical disk may be placed on and attached to the disk table 9 with a central opening 2a of the optical disk 2 in alignment with the center of the disk table 9. After the optical disk 2 is attached in this manner to the disk table 9, a chucking arm 11 is turned towards the disk table 9 in the direction shown by the arrow mark X in FIG. 3 until a disk clamper 12 attached to the end of the chucking arm 11 is pressured onto the optical disk 2 so that the optical disk may be revolved in unison with the disk table 9.

The optical disk 2 thus clamped to the disk table 9 is confronted by an optical pick-up unit 14 slidably supported by guide shafts 13, 13 mounted to the chassis base plate 7.

In a disk loading device of the type in which the optical disk 2 supported on the disk transfer table 3 movable with respect to the main body of the player 1 is mounted on the disk table 9 within the main body of the player 1, it is necessary that the optical disk 2 be supported at the controlled position on the disk transfer table 3, so as to provide for accurate and positive attachment of the optical disk to the disk table 9. To this end, the annular recess 6 formed on the disk transfer table 3 has the radius $R_4$ corresponding to the radius $R_3$; of the optical disk 2 supported therein and the outer peripheral surface 2a of the optical disk 2 is supported by the upright peripheral surface 6a of the annular recess 6 to control the support position of the disk 2.

In a disk player shown in the Japanese Laid-open Patent Publication No. 231966/1985, a disk inserting opening 16 is provided in the main body of the player 15, see FIG. 4. In the vicinity of the disk inserting opening 16, there are provided a stationary guide plate 20 and a movable guide plate 19 facing to the stationary guide plate and mounted through the medium of the loading arms 18, 18, rotatably supported by frames 17, 17, see FIG. 5. The optical disk 2 is adapted to be introduced into the main body of the player 15 through a gap formed by these guide plates 19, 20. A pair of rolls, that is, a stationary roll 21 and a driving roll 22, each having a reduced diameter at the center and having the diameter gradually increasing towards both ends, are provided at a position to receive the disk 2 inserted through the gap defined between these guide plates 19, 20. The optical disk 2 is clamped between these rolls 21, 22. The driving roll 22 is transferred onto the disk table 9 of the rotary driving unit 8 mounted in the inside of the main body of the player 15 by a driving electric motor 24 through a drive gearing 23 as shown in FIG. 6 for mounting the disk.

In the above disk player, when the optical disk 2 has been transferred onto the disk table 9, the loading arms 18, 18 are turned to lower the driving roll 22 and the movable guide plate 19 for attaching the disk to the disk table 9 with the central opening 2a of the disk 2 in alignment with the center of the disk table 9. Following the lowering of the roll 22 and the guide plate 19, the chucking arm 11 is turned until the disk clamper 12 provided to the arm end is pressured onto the optical disk 2 so that the disk is clamped for rotation in unison with the disk table 9.

There is also known a disk player in which the optical disk is not clamped automatically to the disk table but in which a cover fitted with a disk clamper in opposition to the disk table of the disk drive device mounted in a substantially vertical position within the main body of the player is mounted for rotation relative to a player cabinet accommodating the main body of the player, so that the disk 2 is clamped for rotation in the upstanding position. The cover is provided with a disk position regulating member adapted for regulating the radial stroke of the disk to provide for an optimum disk clamping by the disk clamper and the disk table. This cover is rotated with the disk placed thereon with the stroke of the disk movement being controlled by the disk position regulating member so that the optical disk is clamped to the disk table.

In the above disk player, the disk position regulating member provided to the cover is provided at a position corresponding to the outer periphery of the disk for coinciding the central opening of the optical disk with the center of the disk table for centering the disk relative to the disk table to regulate the position of the optical disk.

In the above disk players, an optical disk having a predetermined unified disk diameter is necessarily employed. Thus the following problems are presented when an optical disk having different sizes as described above are to be reproduced by the above disk players. In the disk player disclosed in the aforementioned Japanese Laid-open Utility Model Publication No. 145367/1986, disk movement is regulated with the outer peripheral surface 2a of the optical disk 2 abutting on the upright peripheral wall 6a of the annular recess 6 formed on the disk transfer table 3 for matching the disk position relative to the disk table 9. Thus an optical disk other than the optical disk mating with the annular recess 6 cannot be transported at a predetermined support position. Thus disks of different sizes cannot be attached to the disk table 9 with correct centering, so that the disk cannot be clamped by the disk clamper 12 for rotation.

In the disk player shown in the aforementioned Japanese Laid-open Patent Publication No. 231966/1985, the optical disk 2 inserted through the disk inserting opening 16 is clamped by the stationary roll 21 and the driving roll 22 so as to be transferred and attached to the disk table 9 in the main body of the player 15. Thus an optical disk of a size other than a prescribed size cannot be centered with respect to the disk table 9 because the disk 2 then has a variable transfer stroke such that the disk cannot be clamped by the disk clamper 12 for rotation.

In the above described disk player in which the cover is rotatably mounted to the main body of the player and the disk regulated in its position is attached to the disk table, position matching between the disk and the disk player is achieved by having the outer peripheral edge of the optical disk supported as described above. Thus, when an optical disk of a different size is placed on the cover and the latter is turned in a direction to clamp the optical disk, the center of the optical disk cannot be coincided with that of the optical disk or that of the disk clamper and thus correct positioning cannot be achieved. Thus it is not possible to clamp the disk by the disk table and the disk clamper and thus it is not possible to rotate the disk.

There has been proposed an optical disk having a variable size in dependence upon the amount of recorded information. Since the optical disk is capable of recording an extremely large number of information signals, when recording a small amount of the information signals, such as only one or two numbers, the majority of the signal record area remains void or free of recorded signals. Thus an optical disk of a reduced size has been proposed in order to make an efficient use of the disk material and the signal record area so as to provide for simplified handling and to adapt the disk to the amount of the recorded information.

However, such small size optical disk has a drawback that it cannot be loaded in the above described conventional disk players for recording or reproduction.

OBJECT AND SUMMARY OF THE INVENTION

It is therefore an object of the present invention to provide an apparatus for adapting the disk diameter wherein a disk with a diameter less than that of a disk having the unified prescribed outside diameter can be made to be handled in the same way as the disk of the unified diameter to make possible loading thereof into aforementioned conventional extensively employed disk players.

The present invention provides an arrangement wherein the outer periphery of the disk-like recording medium is held by the inner periphery of a toroidal holder, to the inner periphery of which the disk-like recording medium is fitted, in order to provide for unifying the small size disk with respect to the size or diameter to the disk of the unified size or diameter.

According to the present invention, the recording medium may be substantially assimilated in diameter to the outside diameter of the holder, by having the disk-like recording medium, such as the optical disk held by holding means provided to the inner periphery of the holder, so as to render the holder as one with the disk-like recording medium.

BRIEF DESCRIPTION OF THE DRAWINGS

FIG. 40 is a plan view of a state of holding the small size disk;

FIG. 41 is a sectional view taken along line L—L of FIG. 40;

FIG. 42 is a sectional view taken along line M—M of FIG. 40; and

FIG. 43 is a sectional view taken along line N—N of FIG. 40.

DESCRIPTION OF PREFERRED EMBODIMENTS

By referring to the accompanying drawings, certain preferred embodiments of the present invention wil be explained in detail.

The first embodiment of the apparatus for adapting the disk diameter according to the present invention will now be explained.

Figure 7:
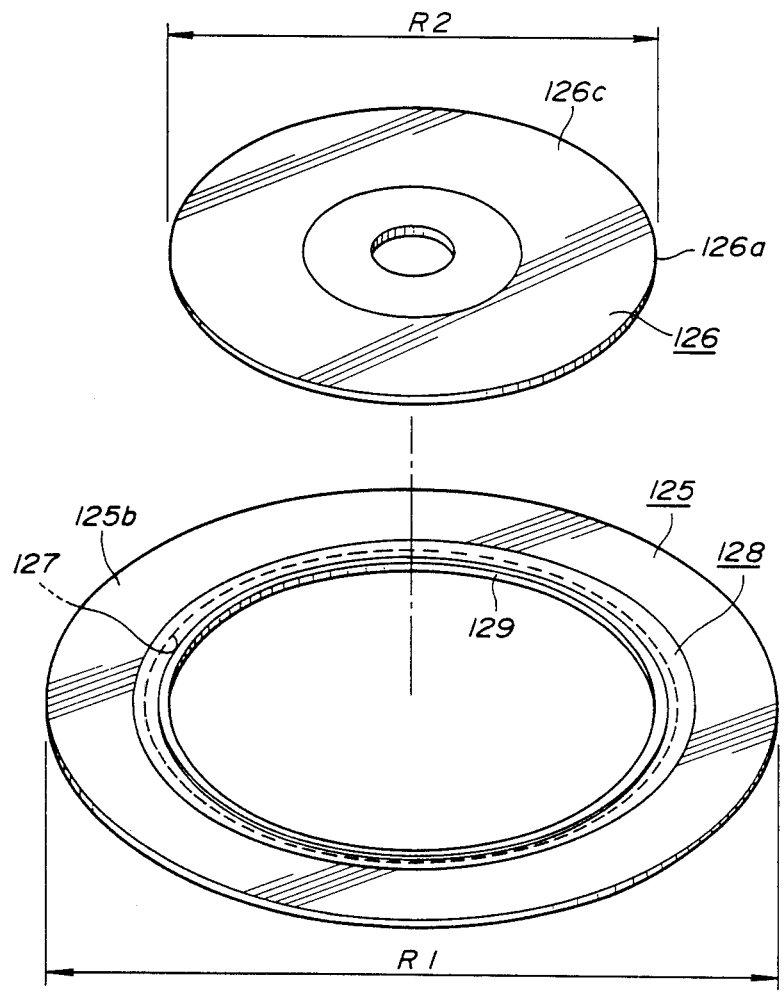
FIG. 7 is a perspective view showing a first embodiment of an apparatus for adapting the diameter of a disk-like recording medium of the present invention.

The apparatus shown herein has a toroidal holder 125 having an outside diameter $R_1$ equal to the radius $R_3$ of the aforementioned optical disk 2 which is a conventional socalled compact disk having a unified disk size of 12 cm as shown in FIG. 7.

Figure 8:
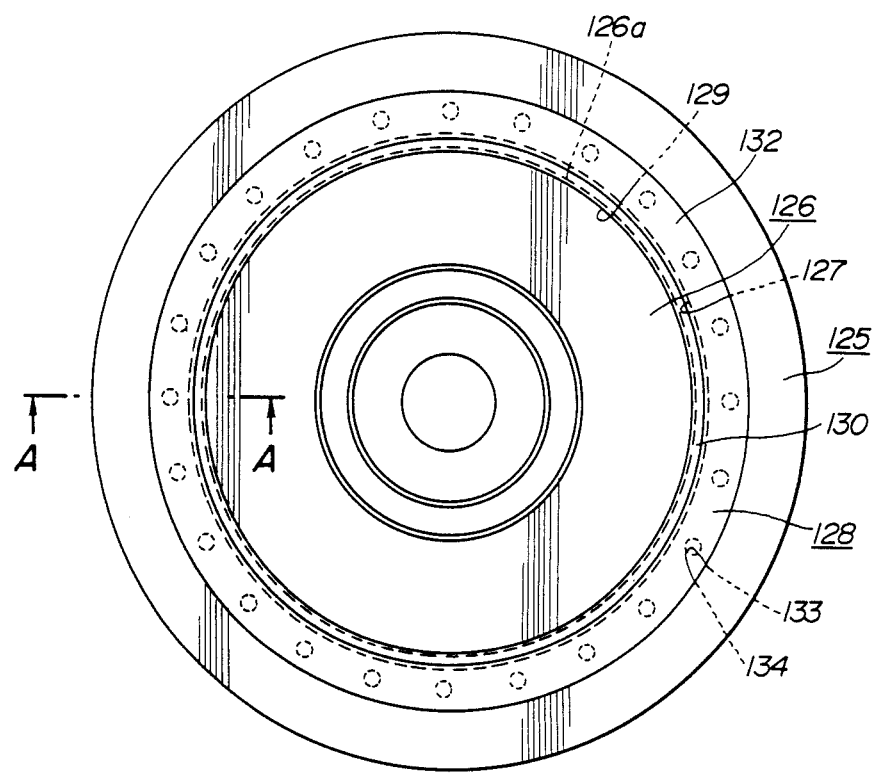
FIG. 8 is a plan view illustrating a state with a small size disk being held.
Figure 9:
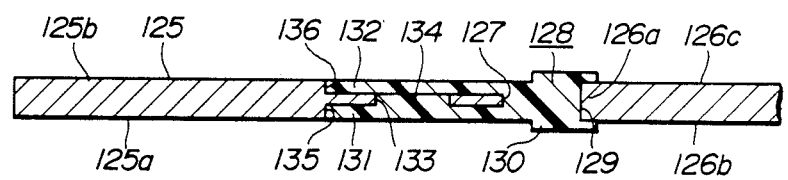
FIG. 9 is an enlarged sectional view taken substantially along line A—A of FIG. 2.

The holder 125 is formed of synthetic material having prescribed rigidity, such as the ABS resin, and has a thickness approximately equal to that of the optical disk 2. On the side of the inner periphery of the holder 125, there is formed a disk fitting opening 127 in which there is fitted a small size disk 126 having a disk diameter $R_2$, for example 8 cm, which is less than that of the aforementioned unified optical disk 2. On the periphery of the fitting opening 127, there is mounted a toroidal disk holding member 128 made of rubber or the resilient synthetic material as the holding means for holding the outer peripheral portion 126a of the small size disk 126. As shown in FIG. 9, the disk holding member 128 is comprised of a disk holding portion 130 having its inner peripheral surface formed with a disk engaging groove 129 adapted for engaging with the outer peripheral portion 126a of the small size disk 126, and a pair of clamping pieces 131, 132 for the holder 125 extending outwardly from the disk holding portion 130. On the inner side of the clamping piece 131, there are formed a number of engaging projections 134 adapted for engaging in a corresponding number of mating engaging openings 133 formed in the holder 125 along the disk fitting opening 127. The disk holding member 128 arranged and constructed as described above is fitted to the inner periphery of the holder 125, as shown in FIGS. 7 and 8, with the clamping pieces 131, 132 clamping the periphery of the holder 125 in the vicinity of the disk fitting openings 127 and with the engaging projections 134 engaging with the mating engaging openings 133.

It is noted that the portion of the holder 125 clamped by the clamping pieces 131, 132 is formed with steps 135, 136 and thus reduced in thickness such that the clamping pieces 131, 132 lie substantially flush with both sides of the holder 125.

It is noted that, when only one side of the small size disk 126 is designed as the signal record surface, the disk 126 can be attached to the optical pickup device in the disk player only in a predetermined attachment orientation. For indicating the attachment orientation of the small-size disk 126, the one surface of the holder 125 is designed as a mirror surface 125a, that is, the surface having the same optical properties as those of the optical recording medium of the small size disk 126, which mirror surface has the appearance similar to that of the signal record surface 126b of the small size disk 126. The other surface thereof is designed as a printed surface bearing printed handling instructions similarly to the other face 126c of the small size disk 126.

It is noted that, for indicating the attachment orientation of the small size disk 126, any other indicating means such as labels or stamping may be employed.

In the above described disk diameter change device, the small size disk 126 is fitted to the disk holding member 128 with the signal record surface 126b laying on the same side as the mirror surface 125a of the holder 125. When the small size disk 126 is to be introduced into the disk holding member 128, the disk engaging groove 129 is deformed resiliently so that the outer peripheral portion 126a of the disk 126 is introduced and fitted into the disk fitting groove 129 to maintain the small size disk 126 as indicated in FIG. 8.

With the small size disk 126 supported in this manner, the disk 126 is made as one with the holder 125 and thus the resulting assembly is equivalent to the aforementioned optical disk having the unified disk diameter so that the assembly can be handled in the same manner as the aforementioned optical disk.

A second embodiment of the disk radius change device according to the present invention will now be explained.

Figure 10:
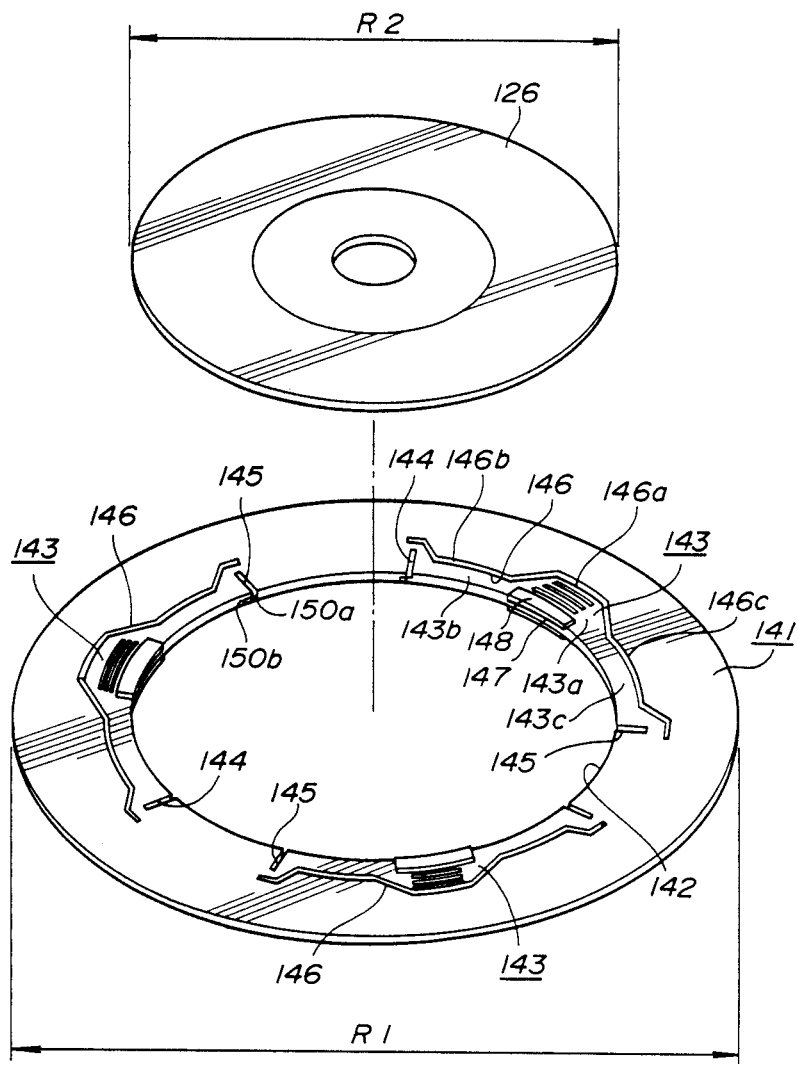
FIG. 10 is a perspective view of a second embodiment of an apparatus for adapting the diameter of a disk-like recording medium of the present invention.

The apparatus for adapting the disk diameter shown herein also has a toroidal holder 141 having the outside diameter $R_1$ equal to the disk diameter $R_3$ of the optical disk 2 which is the conventional and widely employed so-called compact disk with the unified disk size or diameter of 12 cm, as shown in FIG. 10, similarly to the preceding embodiment.

Figures 11, 12:
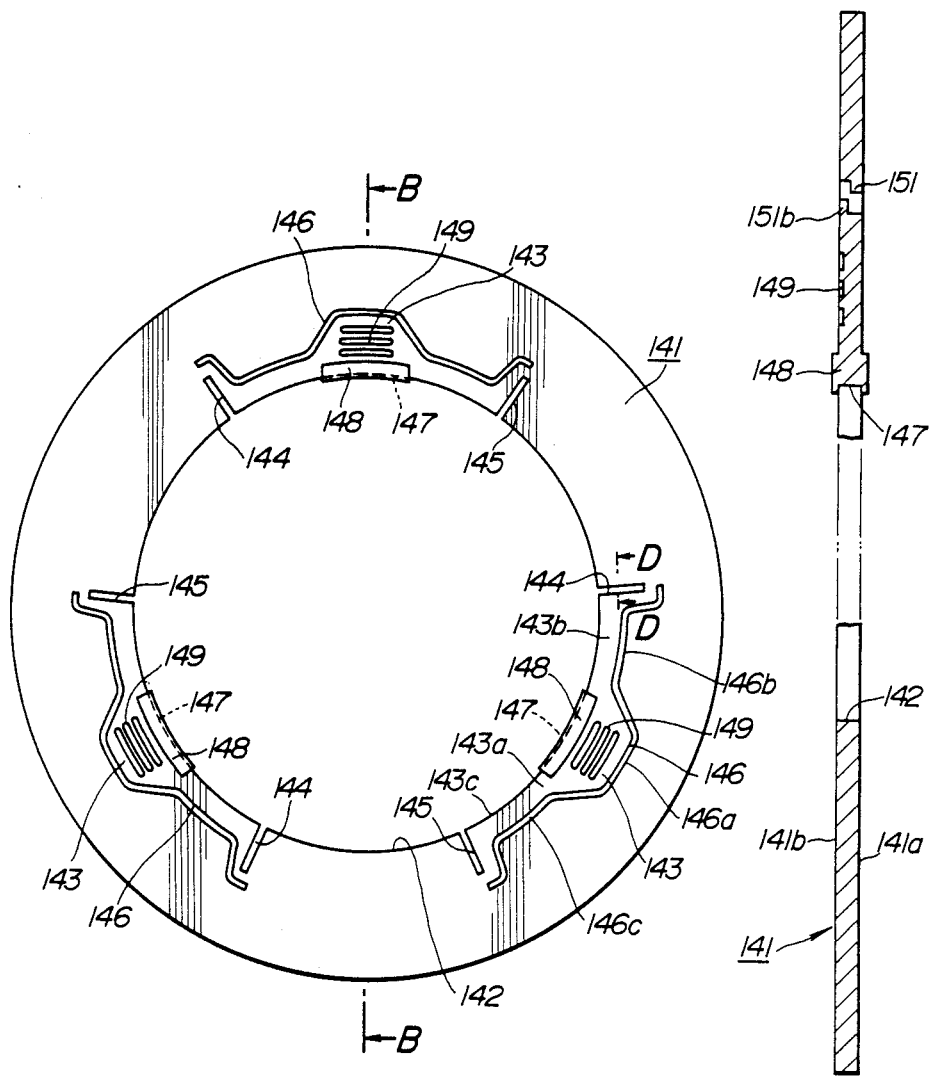
FIG. 11 is a plan view showing a state with a small size disk being held.
FIG. 12 is an enlarged sectional view taken along line B—B of FIG. 1, with portions broken away.
Figure 13:
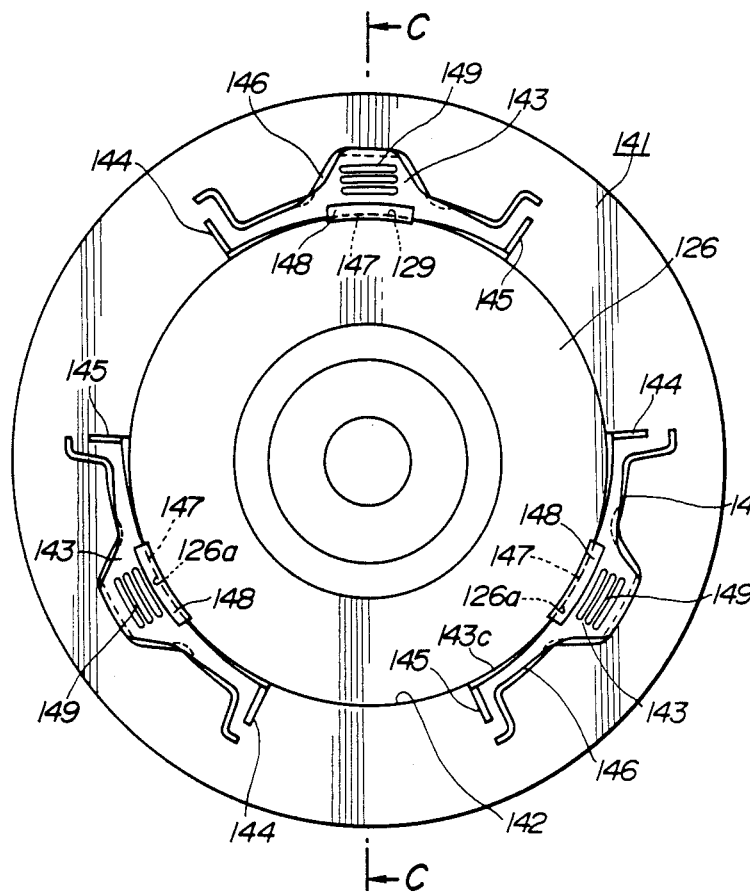
FIG. 13 is a plan view showing a state of a small size disk being held.

The holder 141 is formed of synthetic material having prescribed rigidity, such as ABS resin, and has approximately the same thickness as the aforementioned optical disk. The inner peripheral side of the holder 141 is formed with a disk fitting opening 142 into which a small size disk 126 is fitted having a radius $R_2$ of, for example, 8 cm, which is less than that of the aforementioned unified optical disk, as shown in FIGS. 10 and 11. On the periphery of the opening 142, the holder 141 is formed with three equiangular disk holding sections 143 that may be resiliently deflected radially of the holder 141. Each of these disk holding sections 143 is formed integrally in the holder 141 by forming a pair of slits 144, 145 radially extending some distance from the disk fitting opening 142 and a peripheral slit 146 extending from near the end portions of and between these slits 144, 145. The peripheral slit 146 is comprised of a central slit portion 146a protruding towards the outer periphery of the holder 141 and two side slit portions 146b1, 146c extending from both ends of the central slit 146a towards the ends of the radial slits 144, 145 and protruding in a reverse direction, that is, towards the disk fitting opening 142. The disk holding section 143 formed in this manner by boring the peripheral slit 146 has its central widened portion 143a supported by a pair of continuous narrow arm portions 143b, 143c, and is so designed that the widened portion 143a may be supported resiliently and radially of the holder 141 within the extent of the gap of the peripheral slit 146 with the continuous arm portions 143b, 143c being used as the resilient deflective portions.

The side edge of the widened portion 143a of the disk holding portion 143 towards the disk fitting opening 142 is formed with a disk retaining portion 148 protruding towards the disk fitting opening 142 and having an engaging groove 147 adapted to be engaged with the outer peripheral portion 126a of the small size disk 126, as shown in FIG. 12. Therefore, the distance from the center of the holder 141 to the disk retaining portion 148 is selected to be smaller than the radius of the small size disk 126 approximately by the gap of the peripheral slit 146. The one side of each widened portion 143a is formed with a finger rest projections 149 formed by recesses or grooves for facilitating the operation of resiliently deflecting or enlarging the diameter at the disk holding portion 143 during the operation of fitting the small size disk 126.

Figure 14:
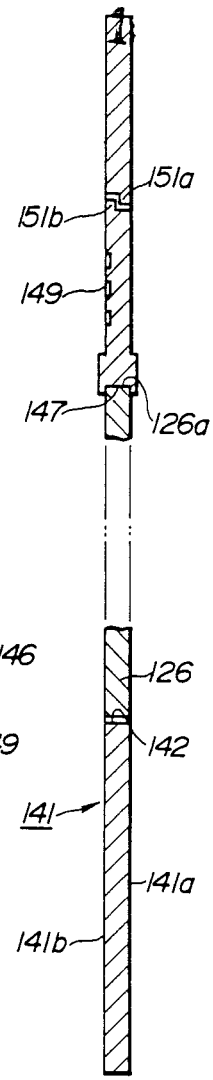
FIG. 14 is an enlarged sectional view taken along line C—C of FIG. 13, with portions broken away.
Figure 15:
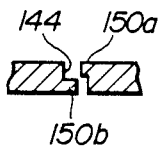
FIG. 15 is an enlarged sectional view taken along line D—D of FIG. 13.

It is noted that, on the confronting sides of the radially extending slits 144, 145 and the peripheral slit 146, steps or projections 150a, 150b, 151a, 151b are formed, as shown in FIGS. 14 and 15. When the small size disk 126 is attached to the holder 141 to cause resilient deflection of the disk holding sections 143, these steps 150a, 150b, 151a, 151b are engaged with one another to close the slits 144, 145 and 146. Similarly to the preceding first embodiment, the one side of the holder 141 of the present embodiment is formed as a mirror surface 141a having an appearance similar to that of the signal recording surface 126b of the disk 126, while its other side is formed as a printed surface bearing printed handling instructions similarly to the other side 126c of the disk 126, for clarifying the attachment orientation of the small-size disk 126.

When attaching the small size disk 126 to the apparatus as described above, the outer peripheral portion 126a of the small size disk 126 is engaged with the engaging groove 147 of one of the disk holding portions 143, with the mirror surface 125a of the holder 141 lying on the same side as the signal recording surface 126b of the small size disk 126, and the disk holding section 143 is resiliently deflected to increase its diameter for fitting the small-size disk 126 in the disk fitting opening 142. Following this operation, the remaining disk holding sections 143 are also resiliently deflected by applying finger pressure so as to be increased in diameter, the outer peripheral portion 126a of the small-size disk 126 being engaged in the engaging grooves 147 of these disk holding sections 143. In this manner, the small size disk 126 is made as one with the holder 141 and the resulting assembly has the same diameter as that of the aforementioned optical disk having the unified disk size so that it can be handled in the same manner as the optical disk.

It is noted that the confronting sides of the radially extending slits 144, 145 and the peripheral slit 146 formed in the holder 141, are formed with steps or projections 150a, 150b, 151a, 151b meshing with one another to close the radially extending slits 144, 145 and the peripheral slit 146 when the small size disk 126 is held therein as described hereinabove. In this manner, when the small-size disk 126 is held and attached to the disk player and irradiated with a laser beam from an optical pickup device, transmission leakage of the laser beam (or of the light beam from a detector in the case of a disk player having a detecting unit adapted for detecting the start or end of disk loading by the light beam from the detector) may be prevented from occurring. Thus the disk utilizing a laser beam may be handled in the same manner as the optical disk having the unified disk size.

It is noted that, for further assuring tight sealing of the small-size disk 126 during attachment thereof, bosses or projections, not shown, may be mounted to one of the disk fitting openings 142 for sealing.

A third embodiment of the disk size change device according to the present invention will be hereafter explained. It is noted that, in the above described second embodiment, three equiangular resiliently deflectible disk holding sections are provided at the inner periphery of the holder, these three disk holding sections holding the small size disk. However, only one resiliently deflectible disk holding section may suffice, as shown in FIG. 16.

Figures 16, 17:
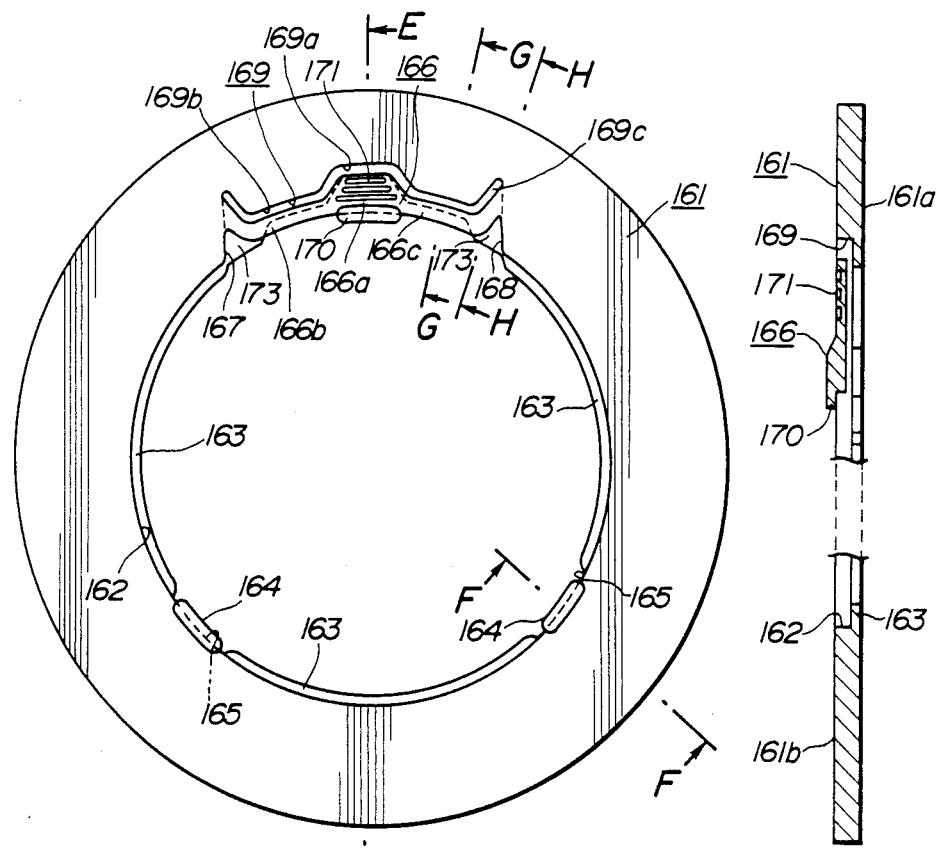
FIG. 16 is a plan view of a third embodiment of an apparatus for adapting the diameter of a disk-like recording medium of the present invention.
FIG. 17 is an enlarged sectional view taken along line E—E of FIG. 16 with portions broken away.

Similarly to the first and second embodiments, the apparatus for adapting the disk diameter shown in FIG. 16 has a toroidal holder 161 having an outside diameter $R_1$ equal to the diameter $R_3$ of the optical disk 2 (diameter, 12 cm) which is the so-called compact disk having the unified size or diameter. The holder 161 is also formed of synthetic material having rigidity similar to the holder of the preceding embodiments, such as the ABS resin, and has a thickness approximately equal to that of the optical disk.

The inner periphery of the holder 161 is formed with a disk fitting opening 162 in which a small size disk 126 having a disk diameter $R_2$, for example 8 cm, which is less than that of the unified optical disk 2, is fitted, as shown in FIG. 16. On the periphery of the fitting opening 62, supporting tongues 163 adapted for supporting the outer peripheral portion 126a of the small size disk 126 are projectingly formed from the one main surface 161a lying on the same side as the signal record surface 126b of the small size disk 126 when the disk 126 is fitted into disk fitting opening 162. These supporting tongues 163 are of a sufficiently reduced thickness and of a width to support only the non-signal record area of the outer peripheral portion 126a of the small size disk 126. On the perimeter of the fitting opening 162 and at two places spaced apart a predetermined angular distance from each other, there are formed so as to protrude from the other main surface 161b facing to the surface provided with the supporting tongues 163, thrusting and supporting tongues 164, 164 adapted for thrusting and supporting the outer peripheral portion 126a of the small size disk 126 in cooperation with the supporting tongues 163. These thrusting and supporting tongues 164, 164 are projectingly formed towards the inner periphery of the fitting opening 162 and of substantially the same width as that of the supporting tongues 163, as shown on FIG. 18. The portions of each of the supporting tongues 163 corresponding to the positions of the thrusting and supporting tongues 164, 164 are formed as recesses 165, 165 in order to assure the withdrawal of the metal mold during molding of the thrusting and supporting tongues 164, 164.

On the perimeter of the fitting opening 162 of the holder 161, there are formed disk holding sections 166 integrally with the holder 161, these disk holding sections being in register with the thrusting and supporting tongues 164, 164 and capable of being resiliently deflected radially of the holder 161. The disk holding sections 166 are comprised of a pair of cut-outs 167, 168 spaced apart from each other at a prescribed distance and extending from the disk fitting opening 162 towards the outer periphery of the holder 161, and a peripheral slit 169 extending between and from near the end parts of these slits 167, 168. The central slit portion 169a of the peripheral slit 169 is protruded towards the outer periphery of the holder 161, while the two side slit portions 169b, 169c extending from both ends of the central slit portion 169a towards the end positions of the cut-outs 167, 168 are protruded in the opposite direction, that is, towards the disk fitting opening 162. The disk holding section 166 thus formed by boring the peripheral slit 169 is so designed that the central widened portion 166a is supported by a pair of narrow continuous arm portions 166b, 166c and the widened portion 166a is resiliently deflectibly supported radially of the holder 161 within the extent of the gap of the peripheral slit 169, with these continuous arm portions 166b, 166c as the resiliently deformable portions.

The side edge of the widened portion 166a of the disk holding section 166 lying towards the disk fitting opening 162 is provided with a thrusting and supporting piece 170 projecting from the other main surface 161b of the holder 161 for thrusting and supporting the peripheral portion 126a of the small size disk 126, see FIG. 17. The distance from the center of the holder 161 to the thrusting and supporting piece 170 is selected to be less than the radius of the small size disk 126 approximately by the gap of the peripheral slit 169. On the other main surface 161b, the widened portion 166a is formed with a finger rest projections 171, formed by recesses or slots, for facilitating the operation of resiliently deflecting or enlarging the diameter of the disk holding section 166 during the fitting operation of the small size disk 126.

The portion of the holder 161 extending from the disk holding portion 166 to the narrow continuous arm portions 166b, 166c is cut-out on the one main surface 161a thereof to provide for reduced thickness of the disk holding section 166. In the portion of the peripheral slit 169 corresponding to the cut-out portion of the holder 161, a step or projection 172 is provided for closing the peripheral slit 169 when the small radius disk 126 is fitted for resiliently deforming the disk holding section 166, see FIG. 19.

Figures 18, 19, 20:
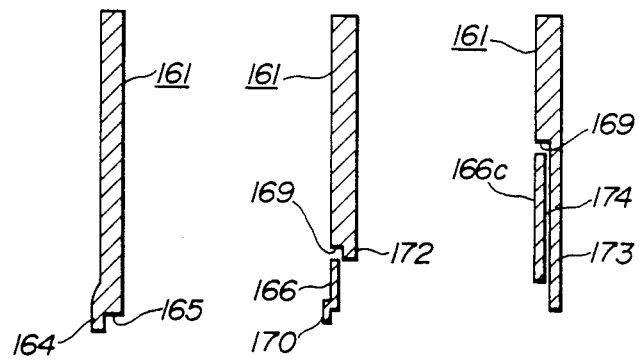
FIG. 18 is an enlarged sectional view taken along line F—F of FIG. 16 with portions broken away.
FIG. 19 is an enlarged sectional view taken along line G—G of FIG. 6.
FIG. 20 is an enlarged sectional view taken along line H—H of FIG. 16.

The portions of the holder 161 formed with the cut-outs 167, 168 are formed with sealing tongues 173, 173 projecting from the one main surface 161a of the holder 161 and extending from the roots of the continuous arm portions 166b, 166c of the disk holding section 166 to the cut-outs 167, 168, as shown in FIG. 20. These tongues 173, 173 are used for preventing the laser beam from an optical pickup device provided to the main body of the player or the light beam from detecting means adapted for start or termination of the disk loading operation from being transmitted through the cut-outs 167, 168. It is noted that, for assuring resilient deformation or one continuous arm portion 166b, 166c, of the disk holding section 166 despite the presence of these sealing tongues 173, 173, a slot 174 is formed in a manner of dividing the continuous arm portions 166b, 166c as shown in FIG. 20.

Similarly to the preceding first and second embodiments, the one side of the holder 161 of the present embodiment is formed as a mirror surface having an appearance similar to that of the signal record surface 126b of the disk 126, while its other side is formed as a printed surface bearing printed handling instructions similar to the other side 126c of the disk 126, for clarifying the attachment orientation of the small size disk 126.

Figures 21, 22:
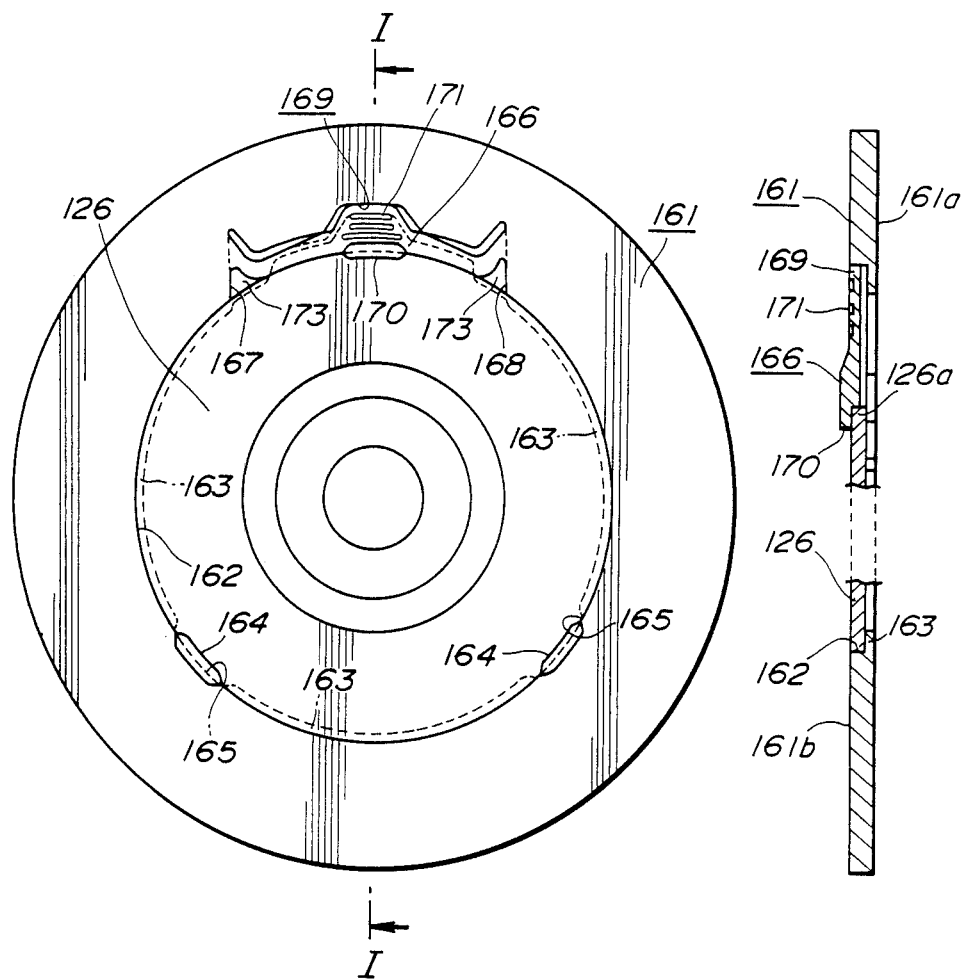
FIG. 21 is a plan view showing a state of a small size disk being held.
FIG. 22 is an enlarged sectional view taken along line I—I of FIG. 21 with portions broken away.

When attaching the small size disk 126 to the apparatus for adapting the disk diameter as described above, the outer peripheral portion 126a of the small size disk 126 is caused to rest on the supporting tongues, with the one main surface 161a of the holder 161 lying on the same side as the signal record surface 126b of the small size disk 126, while the other main surface of the small size disk 126 is placed within the disk fitting opening 162 as it is thrusted and supported by the thrusting and supporting tongues 164, 164. The small size disk 126 is then fitted in the disk fitting opening 162 while the disk holding section 166 is resiliently deflected so as to be enlarged in diameter, after which the disk may be clamped by the supporting tongues 163, thrusting and supporting tongues 164, 164 and the thrusting and supporting pieces 170 by the springback of the disk holding sections 166. As shown in FIG. 21 and 22, the small size disk 126 is made as one with the holder 161 so that an assembly having the same diameter as that of the aforementioned optical disk with the unified disk diameter is provided, which assembly can be handled in the same manner as the optical disk.

A fourth embodiment of the disk size change device according to the present invention will be hereafter explained.

Similarly to the above described preceding embodiments, the disk size change device shown herein is comprised of a small size disk 225 having a diameter of, for example, 8 cm, which is less than the diameter $R_3$, for example 12 cm, of the aforementioned optical disk which is the extensively used diameter. The device further comprises a toroidal a disk supporting member 226 having the same outside diameter $R_1$ as the diameter $R_3$ of the optical disk, and a toroidal disk clamping member 227 attached to the disk supporting member 226 and adapted for clamping the disk 225 in cooperation with the disk supporting member 226, (see FIG. 23).

The small size disk 225 has its diameter $R_2$ less than the diameter of the optical disk 2 having the unified disk size or diameter, but it is configured in the same manner as the aforementioned optical disk regarding the central opening 225a and the non-record area 225b on the perimeter of the central opening 225a which is clamped onto the disk table of the disk player.

Figure 23:
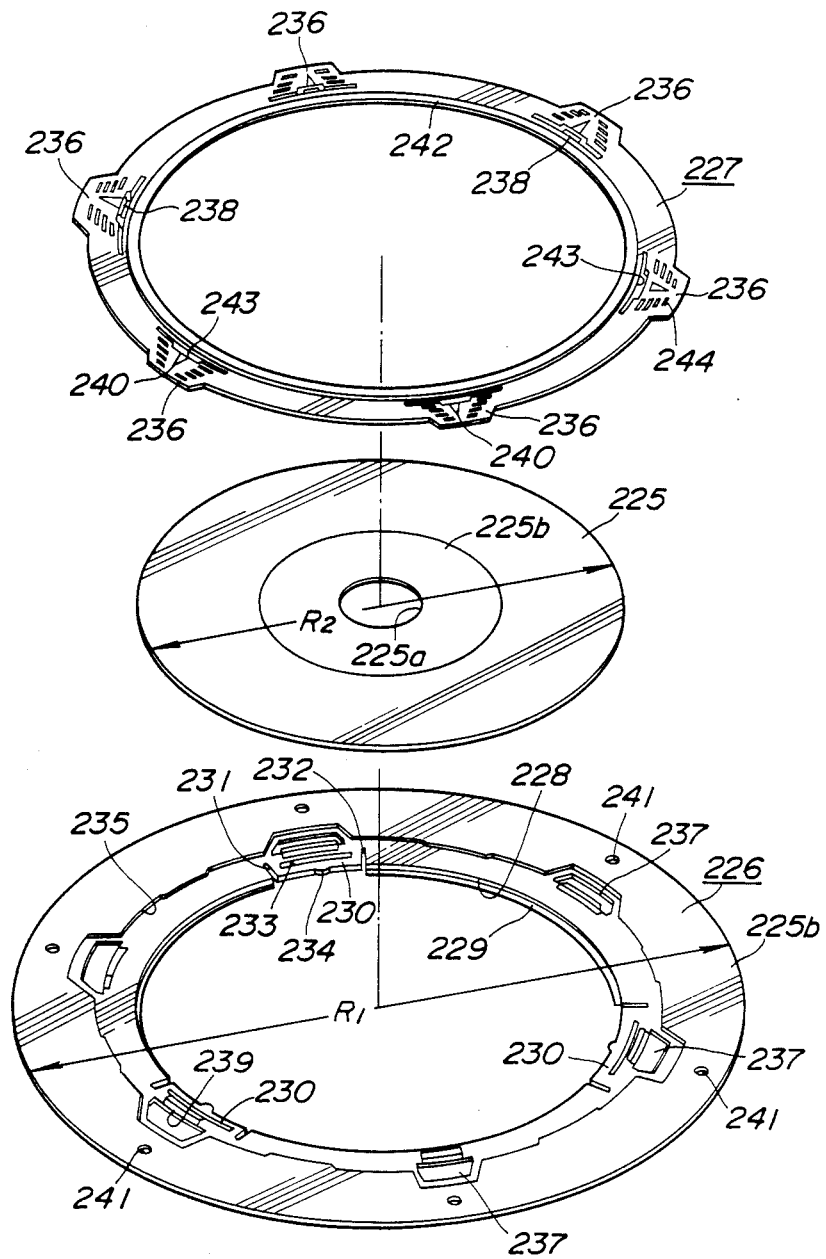
FIG. 23 is an exploded perspective view of a fourth embodiment of an apparatus for adapting the diameter of a disk-like recording medium of the present invention.
Figure 24:
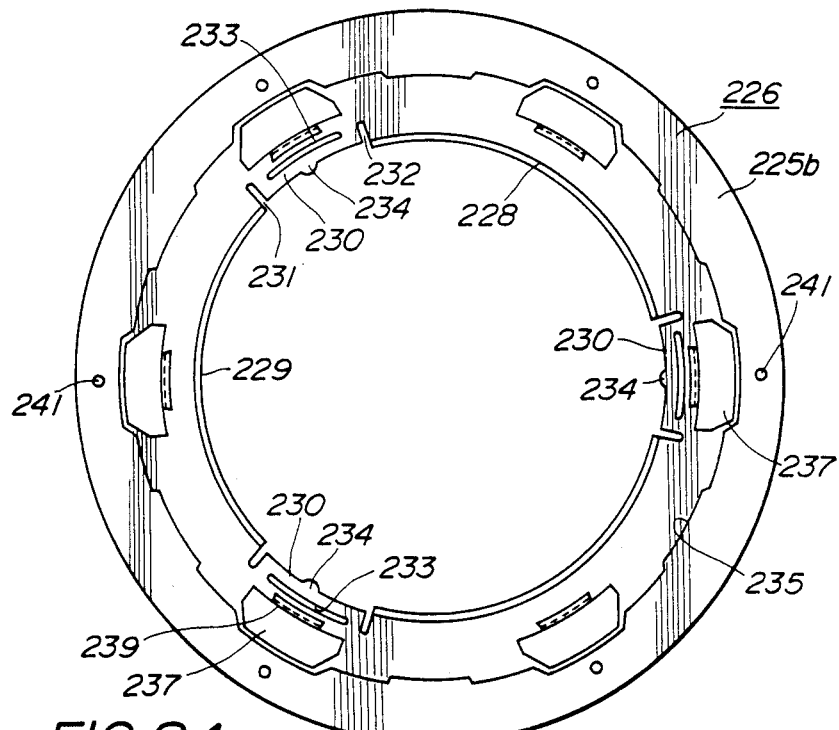
FIG. 24 is a plan view of a disk supporting member which constitutes said apparatus.

The disk supporting member 226 is formed of synthetic material, such as ABS resin, having the prescribed rigidity, and has a thickness about equal to that of the optical disk 2. The inner periphery of the disk supporting member 226 is formed with a disk fitting opening 228 for holding the signal record surface 225c adapted to be exposed from the central opening 225a of the small size disk 225, as shown in FIGS. 23 and 24. On the perimeter of the disk fitting opening 228 and towards one side 226a of the disk supporting member 226 lying on the same side as the signal record hold surface 225c when the small size disk 225 is fitted and supported on the supporting member 226 there are projectingly formed disk supporting pieces 229 on which the disk 225 can be placed with the outer peripheral portion 225d of the disk 225 not bearing the information signals being supported thereon. Three equiangular resilient thrusting sections 230 are formed on the perimeter of the disk fitting opening 228 for clamping and supporting the outer peripheral surface of the disk 225. The thrusting sections 230 are each comprised of a pair of slits 231, 232 extending radially of the disk supporting member 226, a peripheral slit 233 extending between and near the end portions of these slits 231, 232, and a thrusting boss 234 on the inner periphery of the supporting member 226, such that the thrusting section 230 may be resiliently deformed radially of the supporting member 226.

On the inner periphery of the other side 226b of the disk supporting member 226, that is, the surface thereof lying on the same side as a printed surface 225e opposite to the signal record surface 225c, and bearing the printed information, such as indication of record contents, when the small size disk 225 is fitted and supported by the supporting member 226, there is formed an attachment portion 235 into which disk clamping projections 237 are fitted. This attachment portion 235 is formed by forming a step on the other side 226b of the disk supporting member 226 to reduce the thickness thereat. On the outer periphery of the attachment portion 235, there are formed a plurality of, herein six, equiangular openings 237 into which are engaged projections 236 formed on the outer periphery of the disk clamping member 227. On the inner periphery of each of these openings 237, there is formed an engaging recess 239 into which is engaged an engaging piece 238 provided to the disk clamping member 227.

On the other surface 226b of the disk supporting member 226 and at a position corresponding to each of the openings 237, there is provided an indicia 241 for the fitting position corresponding to a mark 240 for the fitting position which is provided on the projection 236 of the disk clamping member 227. The mark 240 and the indicia 241 may be formed by stamping or printing. The projections 236 can be positioned relative to the openings 237 by having the mark 240 and the indicia 241 registered with each other to facilitate the fitting of the projections 236 into the corresponding openings 237.

Figure 25:
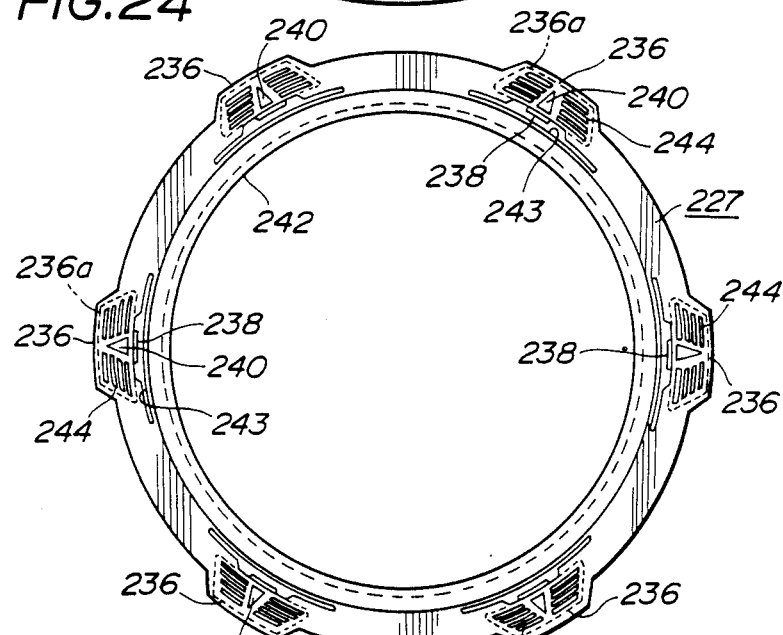
FIG. 25 is a plan view of a disk clamping member which constitutes said apparatus.
Figure 26:
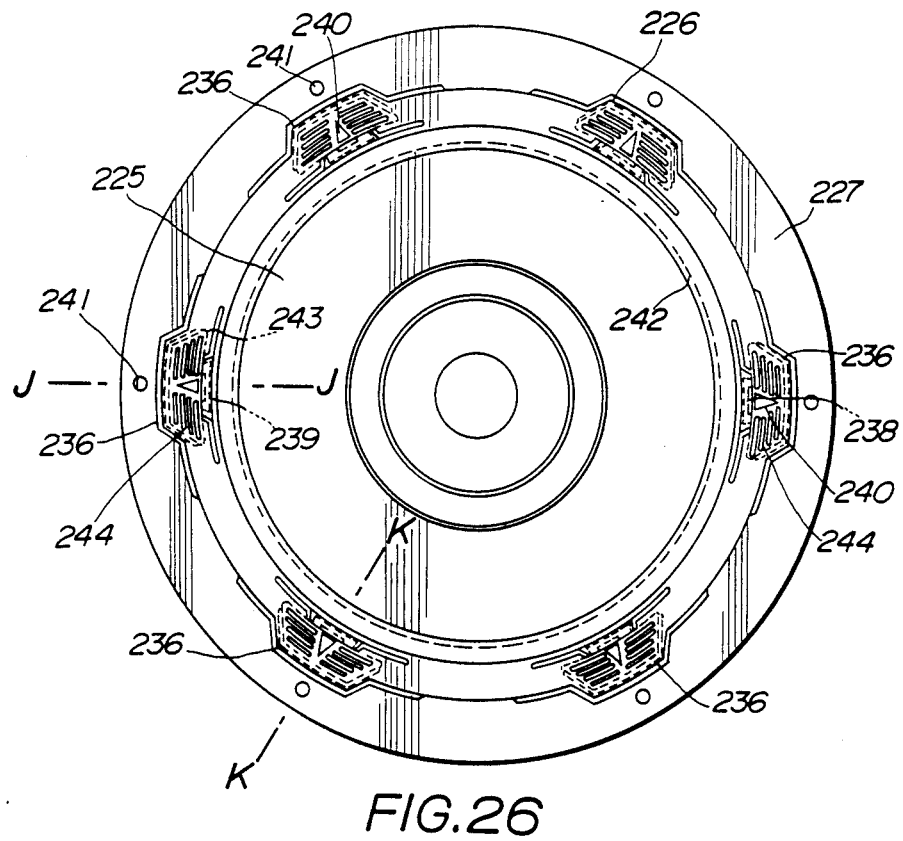
FIG. 26 is a plan view showing a state of a small size disk being clamped.
Figure 27:
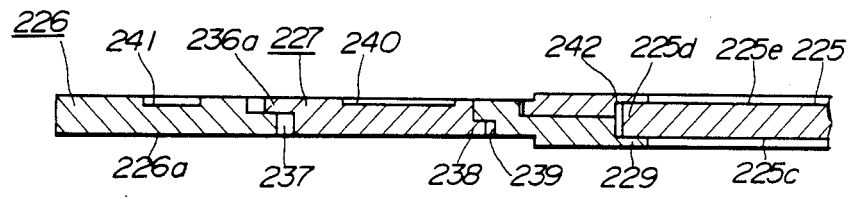
FIG. 27 is an enlarged sectional view taken along line J—J of FIG. 26.
Figure 28:
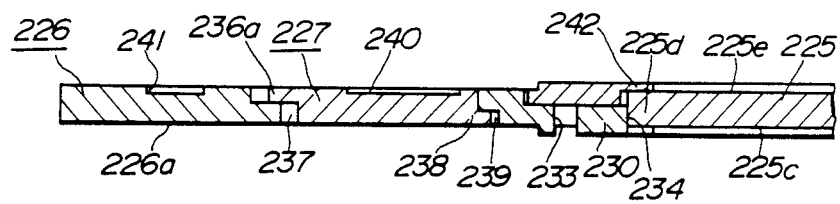
FIG. 28 is an enlarged sectional view taken along line K—K of FIG. 26.

The disk clamping member 227 is formed as a disk from resilient synthetic material or a thin metal plate such a thin stainless steel plate. On the inner periphery of the disk clamping member 227, there is projectingly formed a disk clamping piece 242 for clamping the outer peripheral portion 225d of a small size disk 225 placed on the disk supporting member 226 through the medium of the disk supporting pieces 229 in cooperation with the disk supporting member 227, as shown in FIGS. 25, 26 and 27. The projections 236 are formed on the outer periphery of the disk clamping member 227. On the outer periphery of these projections 236, engaging pieces 236a are projectingly formed for mating with the perimeter of the openings 237, such that, when the projections 236 are engaged in the openings 237, no gap is formed around the perimeter of the engaging openings 237. On the distal side of each of the projections 236, there is formed a cut-out 243 designed to permit the projection 236 to be resiliently deformed radially of the disk clamping member 227, and the aforementioned engaging piece 238 designed to be protruded into the cut-out 243. The upper surface of the projection 236 is counterbored at 244 so as to be used as finger rest projections to facilitate the projection 236 to be resiliently deflected towards the outer periphery when the projection 236 is fitted into the fitting opening 237 of the disk supporting member 226 to cause the projection 236 to be engaged in the engaging recess 239.

It is noted that, when only one side of the small size disk 225 is designed as the signal record surface 225c, similarly to the aforementioned optical disk, the disk 225 can be attached to the optical pickup device in the disk player only in a predetermined orientation. For indicating the attachment orientation of the small-size disk, the one surface 226a of the disk supporting member 226 is designed as a mirror surface having the appearance similar to that of the signal record surface 225c of the disk 225, while the other surface 226b is designed as a printed surface bearing printed handling instructions similarly to the printed surface 225e of the disk 225.

It is noted that any other means may be employed for indicating the orientation of attachment of the small size disk 225.

The operation of having the small size disk 225 clamped by the above described apparatus for adapting the disk apparatus will be hereafter explained.

When the small size disk 225 is to be clamped by the disk size change device, it is placed on the disk supporting member 226, with the outer peripheral portion 225d of the disk 225 retained by the disk supporting pieces 229. The projections 236 are then brought to a position in register with the openings 237 with the aid of the mark 240 and the indicia 241 on the disk supporting member 226, after which the disk clamping members 227 are placed on the attachment portion 235 of the disk supporting member 226 in register with the opening 237. Following this operation, the projections 236 are deformed towards the outer periphery to widen the cut-outs 243, and the projections 238 are brought into positions in register with the openings 237 of the disk supporting member 226, from the lower side thereof, after which the projections 236 are protruded resiliently until the engaging pieces 238 are engaged with the openings 237 for attachment of the disk clamping member 227 to the disk supporting member 226 as shown in FIG. 26. When the disk clamping member 227 is attached to the disk supporting member 226 in this manner, the small size disk 225 is supported within the disk receiving opening 228 of the disk supporting member 226 with the outer peripheral portion 225d thereof clamped by the disk supporting pieces 229 of the disk supporting member 226 and by the disk clamping pieces 242 of the disk clamping member 227.

With the small size disk 225 being supported by and made as one with the disk supporting member 226 as described above, the diameter $R_2$ of the small size disk 225 is assimilated to the outside diameter $R_1$ of the disk supporting member 226 so that the resulting assembly is equivalent to the optical disk 2 having the unified diameter $R_3$ and thus can be handled in the same manner as the optical disk 2.

In the present embodiment, the disk supporting pieces 229 are provided to the periphery of the disk receiving opening 228 of the disk supporting member 226 and the small size disk 225 is placed in position with the aid of the disk supporting pieces 229. However, instead of providing the disk supporting pieces 229, retaining steps may be formed on the outer periphery of the disk 225 so as to be engaged with the inner periphery of the attachment portion 235 for the disk clamping member 227.

A fifth embodiment of the disk size change device of the present invention will be hereafter explained.

The embodiment shown herein differs from the previously explained fourth embodiment with reference to the structure for mounting the disk clamping member 227 to the disk supporting member 226. Therefore, in the following description, only the portions different in structure from the fourth embodiment will the explained, and the description of the common portions will be omitted for simplicity.

The present fifth embodiment is so designed that, after the disk clamping member 227 is fitted to the disk supporting member 226, the disk clamping member 227 is turned so as to be attached to the disk supporting member 226.

Figure 29:
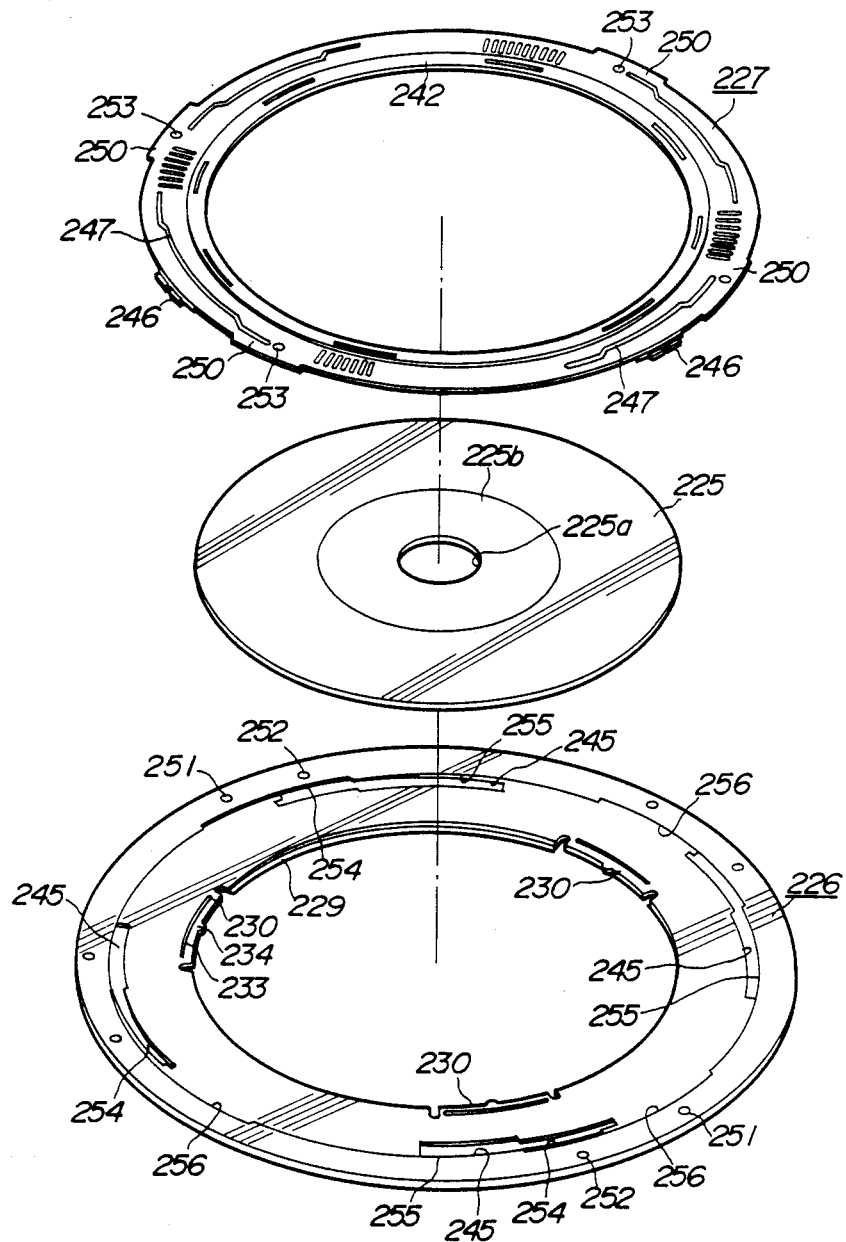
FIG. 29 is a perspective view of a fifth embodiment of an apparatus for adapting the diameter of a disk-like recording medium of the present invention.
Figure 31:
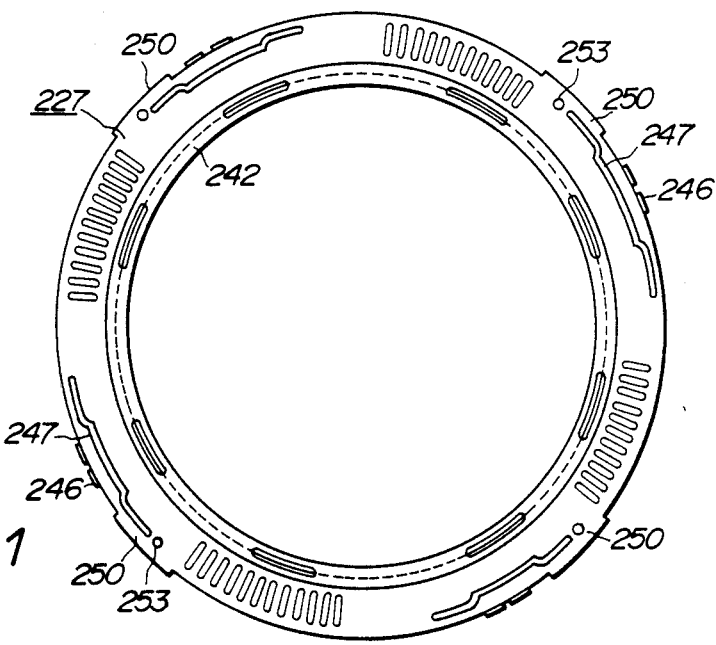
FIG. 31 is a plan view of a disk clamping member which constitutes said apparatus.

As shown in FIGS. 29 and 31, the disk clamping member 227 of the present embodiment is provided with a plurality of, herein four, downwardly projecting pieces 246 on the outer peripheral portion thereof facing to the attachment portion 235 of the disk supporting member 226, these projecting pieces engaging in mating engaging slots 245 formed on the outer periphery of the attachment portion 235 for the disk clamping member 227. On the proximate ends of these projecting pieces 246, there are bored slits 247 adapted to permit the radial deflection of the projecting pieces 246. The end part of each of the engaging projections 246 is formed with an engaging recess 249 into which an engaging projection 248 engaging with the disk supporting member 226 is engaged when the engaging projections 246 are engaged with the mating engaging slots 245.

The outer periphery of the attachment portion 235 for the disk clamping member is formed with guide pieces 250 adjacent to the engaging projections 246, these guide pieces being used as the guide when the disk clamping member 227 is engaged with the disk supporting member 226 and the projecting pieces 246 are rotated manually into engagement with the mating engaging slots 245. On the surface of the guide piece 250, there is formed an indicia 253 for indicating the rotary position for each of the projecting pieces 246 as by stamping or printing. This indicia 253 is associated with indicias 251, 252 on the other surface 226b of the disk supporting member 226 indicating non-lock and lock positions for the projecting pieces 246 with respect to the mating engaging slots 245, respectively.

Figure 30:
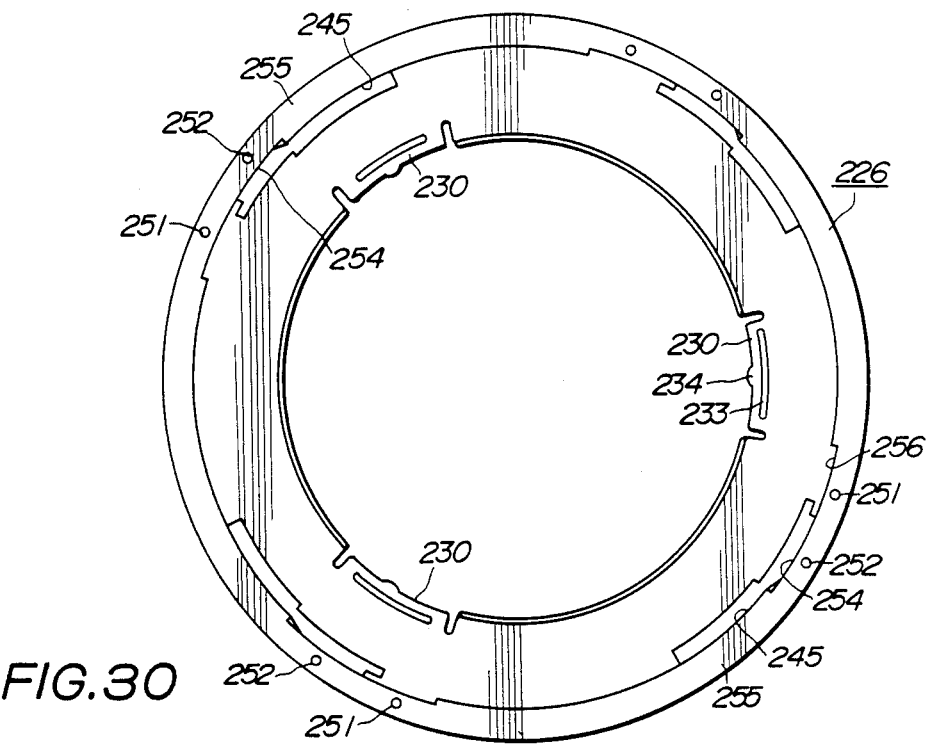
FIG. 30 is a plan view of a disk supporting member which constitutes said apparatus.
Figure 33:
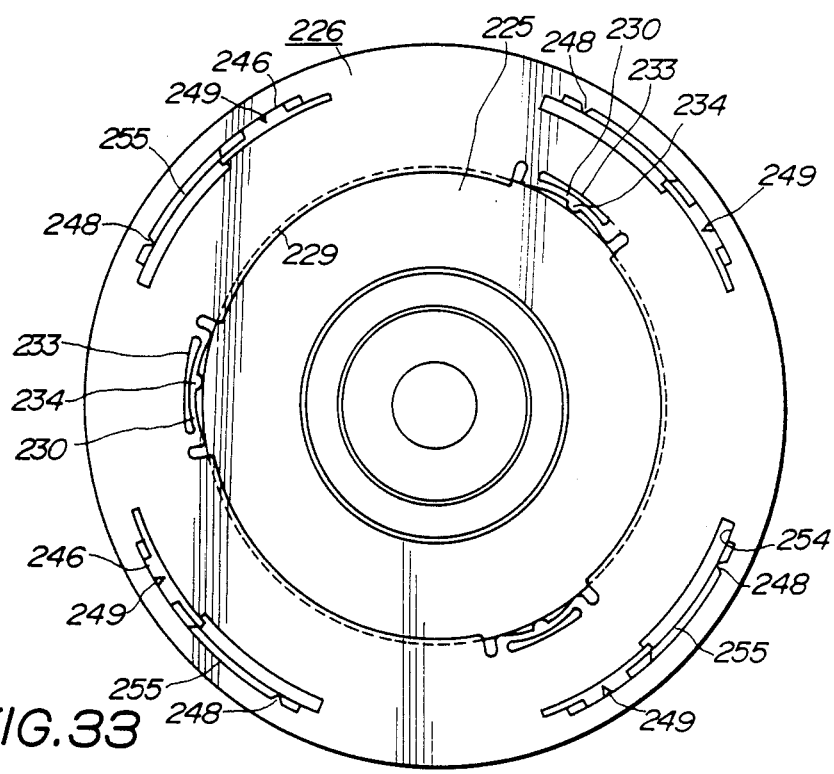
Figure 34:
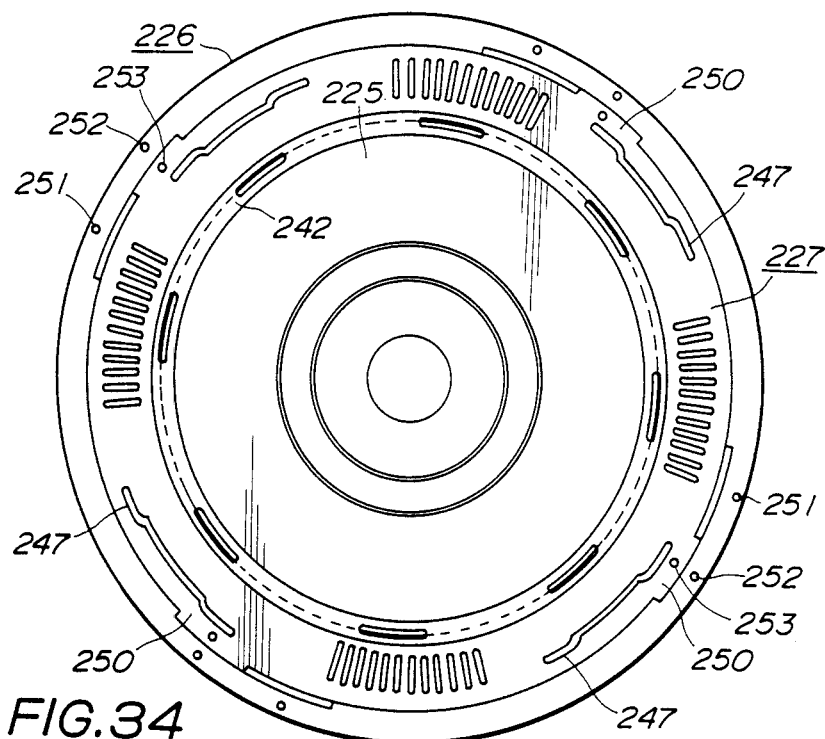
FIGS. 34 and 35 are a plan view and a bottom view, respectively, illustrating a clamping state of the small size disk.
Figure 35:
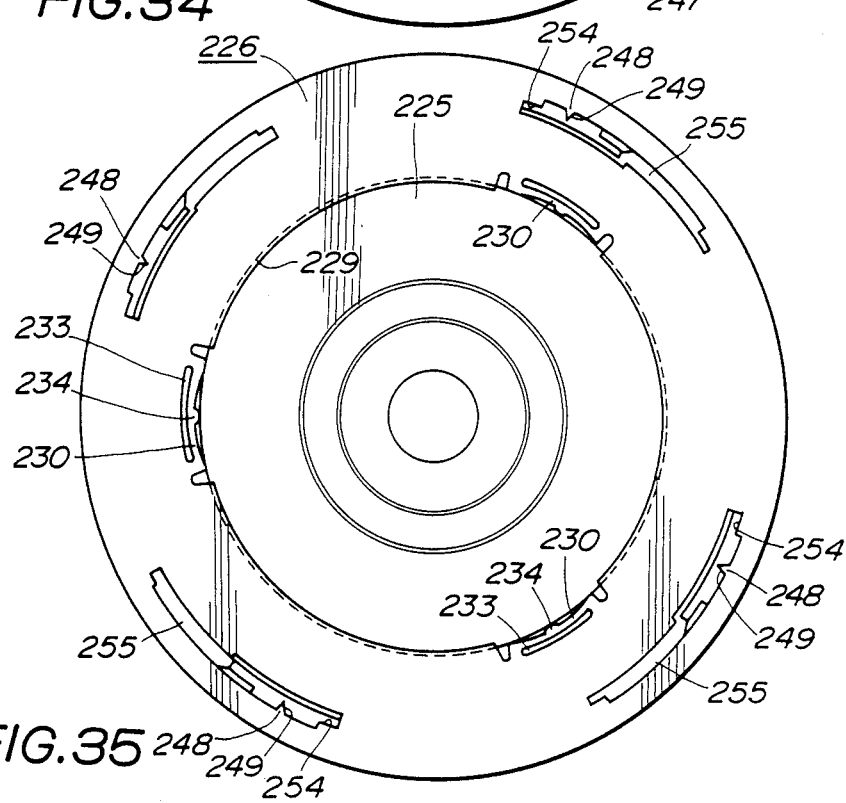

As shown in FIGS. 29 and 30, there are formed in the disk supporting member 226 and on the side of the outer periphery of the attachment portion 235 for the disk clamping member 227 the aforementioned mating engaging slots 245 into which are engaged the projecting pieces 246 of the disk clamping member 227. The engaging projecting pieces 246 are introduced into rotation guide slots 254 formed in continuation with these mating engaging slots 245. These guide slots are formed so as to be protruded from the outer periphery of the attachment portion 235 for the disk clamping member 227 towards the outer periphery of the disk supporting member 226 by a distance corresponding to the protrusion of the projecting pieces 246. The outer peripheral edge of the engaging slot 245 is formed with a retaining piece 255 adapted for engaging with the projecting pieces 246 as shown in FIGS. 29 and 33. The one surface of the retaining piece 255 is formed with the aforementioned engaging projections 248 adapted to be engaged with the mating engaging recesses 249 formed at the foremost part of the aforementioned projecting pieces 246. The arrangement is so made that, when the engaging projections 248 are engaged with the engaging recesses 249, the engaging projecting pieces 246 are completely engaged with the mating engaging slots 245.

The outer periphery of the attachment portion 235 for the disk clamping member is formed with recesses 256 by which the disk clamping member 227 may be turned within the extent from a position in which the projecting piece 246 is within the guide opening 254 to a position in which it is locked by interengagement between the guide pieces 250 and the engaging recess 249 to facilitate prompt and reliable attachment of the disk clamping member 227 to the disk supporting member 226.

The operation of having the small size disk 225 clamped by the disk size change device is hereafter explained.

For clamping the small size disk 225, the disk is placed on the disk supporting member 226, with the outer peripheral portion 225d thereof retained on the disk supporting pieces 229, similarly to the fourth embodiment described above.

Figure 32:
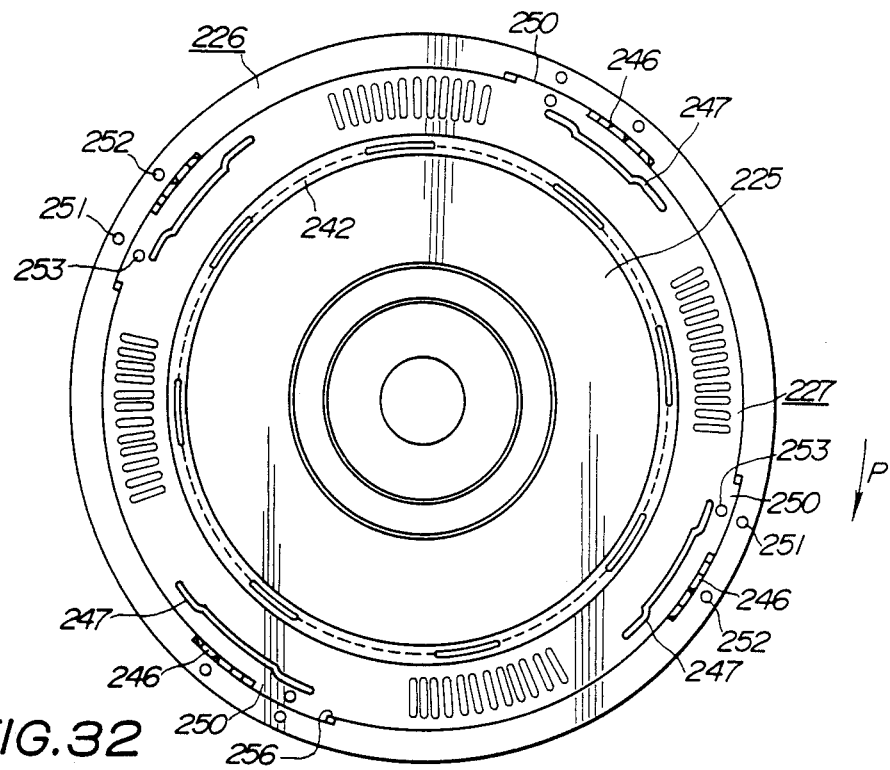
FIGS. 32 and 33 are a plan view and bottom view, respectively, illustrating a state of a small size disk being clamped.

Then, with the indicia 253 on each guide piece 250 in register with the recess 256 of the disk supporting member 226, the disk clamping member 227 is placed on the attachment portion 235 of the disk supporting member 226. When the disk clamping member 227 is placed in this manner, the projecting pieces 246 are received within the guide slots 254 as shown in FIGS. 32 and 33. The disk clamping member 227 is turned from this state in the direction of the arrow mark P in FIG. 32, so that the projecting pieces 246 will be engaged in the mating engaging slots 245. When the disk clamping member 227 is turned until the indicia 253 on the guide opening 254 is in register with the indicia 252, the projecting pieces 246 are engaged with the retaining pieces 255, while the engaging projections 248 are engaged with the corresponding recesses 249 at the end parts of the projecting pieces 246 to provide for locking of the engaging projecting pieces 246 into the mating engaging slots 245 to complete the attachment of the disk clamping member 227 to the disk supporting member 226.

When the disk clamping member 227 is attached to the disk supporting member 226 in this manner, the small size disk 225 is supported within the disk receiving opening 228 of the disk supporting member 226, with the outer peripheral portion 225d thereof clamped by the disk supporting pieces 229 of the disk supporting member 226 and by the disk clamping pieces 242 of the disk clamping member 227.

With the small size disk 225 being supported by and made as one with the disk supporting member 226, as described above, the diameter of the small size disk 225 is assimilated with the outside diameter of the disk supporting member 226 so that the resulting assembly is equivalent to the optical disk 2 having the unified diameter and thus can be handled in the same manner as the optical disk 2.

Instead of providing the disk supporting pieces 229, retaining steps may be provided to the outer peripheral edge of the small size disk 225 so as to be engaged with the inner periphery of the attachment portion 235 for the disk clamping member 227.

A sixth embodiment of the apparatus for adapting the disk size according to the present invention will be hereafter explained.

The apparatus according to the sixth embodiment is shown in FIGS. 36–43, and comprised of a small size disk 325 having a diameter of, for example, 8 cm, which is less than the diameter $R_3$ for example, 12 cm, of the aforementioned optical disk which is the extensively used conventional so-called compact disk having the unified disk diameter, a toroidal disk supporting member 326 having the same outside diameter $R_1$ as the diameter $R_3$ of the optical disk and on which the disk 325 is supported, and a disk holding member 327 attached to the disk supporting member 326 by being rotated, and adapted for holding the disk 325 in cooperation with the disk supporting member 326.

The small size disk 325 has its diameter $R_2$ less than the diameter of the optical disk having the unified disk size or diameter, but it is configured in the same manner as the aforementioned optical disk with reference to the central opening 325a and the non-record area 325b which is clamped onto the disk table of the disk player.

Figure 36:
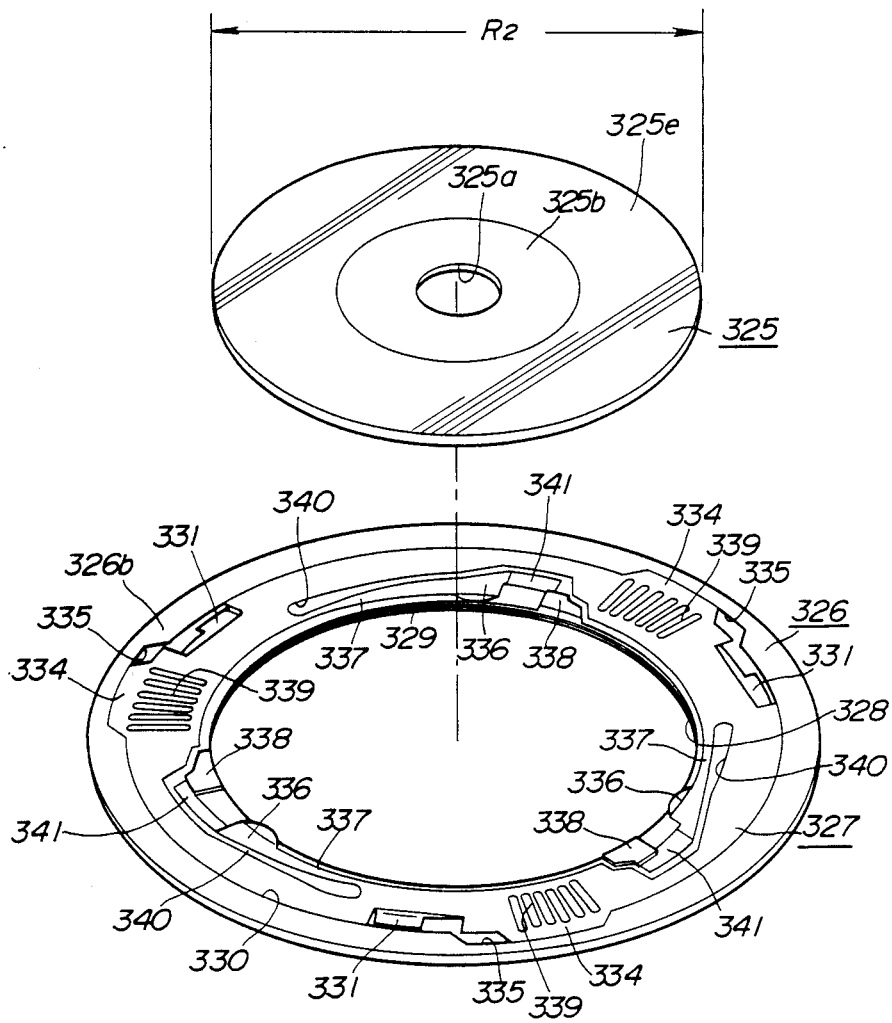
FIG. 36 is a perspective view showing an entirety of a sixth embodiment of an apparatus for adapting the diameter of a disk-like recording medium of the present invention.
Figure 37:
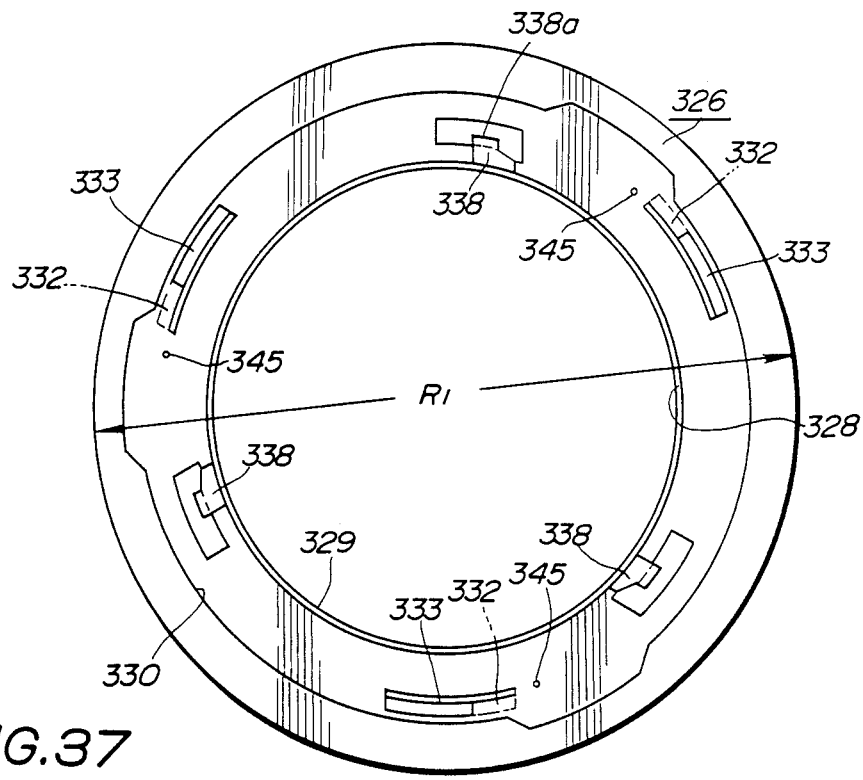
FIG. 37 is a plan view of a disk supporting member which constitutes said apparatus.

The disk supporting member 326 is formed of synthetic resin having the prescribed rigidity, such as ABS resin, and has a thickness about equal to that of the optical disk. The inner periphery of the disk supporting member 326 is formed with a disk fitting opening 328 for holding the disk the signal record surface 325c being adapted to be exposed from the central opening 325a of the small size disk 325, as shown in FIGS. 36 and 37. On the perimeter of the disk fitting opening 328 and on one side 326a of the disk supporting member 326 lying flush with the signal record surface 325c when the small size disk 325 is fitted and supported on the supporting member 326, there are projectingly formed disk supporting pieces 329 on which the small size disk 325 can be placed with the outer peripheral portion 325d of the small size disk 325 not bearing the information signals being supported thereon.

On the other surface 326b of the disk supporting member 326, that is, on the surface therefor lying flush with the printed surface 325e bearing the printed indication of the record contents, viz. the surface opposite to the signal record surface 325c when the small size disk 325 is held therein, there is formed on the inner periphery thereof an attachment portion 330 to which is securely fitted a disk holding member 327. The attachment portion 330 is formed by forming a step on the other surface 326b of the disk supporting member 326 to reduce the thickness thereat.

The outer periphery of the attachment portion 330 is formed with a pair of clamping pieces 332, 333 adapted to support one of a plurality of attachment engaging pieces 331 as by clamping from the upper and the lower sides, these engaging pieces 331 being formed by bending the outer peripheral portion of the toroidal disk holding member 327 attached to the outer periphery of the attachment portion 330. On the outer periphery of the attachment portion 330 for the disk holding member 327, there are formed a plurality of recesses 335 in continuation to the pairs of clamping pieces 332, 333, into which are engaged rotation guide pieces 334 projectingly formed on the outer periphery of the disk holding member 327. Thus the extent of rotation of the rotation guide pieces 334 is controlled by the corresponding recesses 335 to control the rotary position of the disk holding member 327. On the inner periphery of the attachment portion 330 for the disk holding member 327 and on the inner peripheral end of the disk holding member 327, there are projectingly formed cam pieces 338 by which resiliently deflectible arms 337 each integrally formed with a disk holding piece 336 that may be projected into the disk fitting opening 328 may be moved radially of the disk holding member 327.

Figure 38:
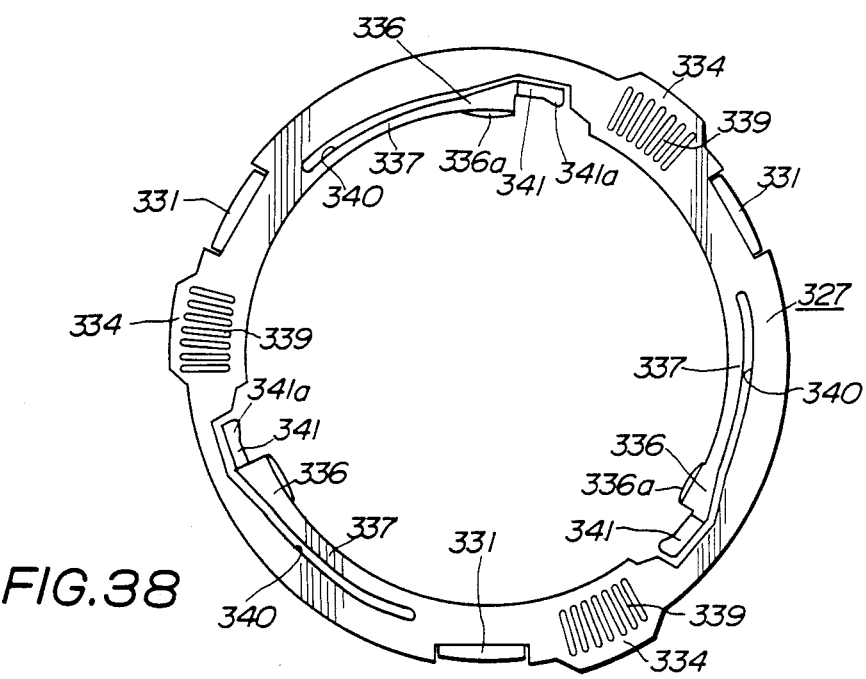
FIG. 38 is a plan view of a disk holding member which constitutes said apparatus.

The disk holding member 327 rotatably mounted to the attachment portion 330 for the disk holding member is prepared by punching a thin metal plate, such as a stainless steel plate, or by molding a synthetic material, into the form of a substantially toroidal piece, as shown in FIG. 38. In the present embodiment, it is formed by punching a stainless steel plate.

The rotation guide pieces 334 provided on the disk holding member 327 are each formed with a number of radially extending recesses or grooves 339 to provide finger rest projections on which a user may act with his finger tips to cause rotation of the disk holding member 327.

The resilient deflectible arm 337 formed with the disk holding member 327 at the end thereof is formed by boring a slit 340 along the periphery of the disk holding member 327. The slit 340 is formed with an arc offset with respect to the center of the disk holding member 327. The resilient deflectible arm 337 thus formed by boring the slit 340 may be resiliently deflected so that the disk holding piece 336 at the end thereof may be moved radially of the disk holding member 327 with the proximate portion of the disk holding member 327 as center.

The end part of each resilient deflectible arm 337 is extended as a rotation operating piece 341 having a boss 341a on one side adapted to engage with a cam piece 338 projectingly mounted to the disk supporting member 326.

The above described disk holding member 327 is attached to the disk supporting member 326 by engaging the rotation guide pieces 334 in the corresponding recesses 335, clamping the respective engaging pieces 331 between the corresponding sets of clamping pieces 332, 333 and by engaging the rotation operating pieces 341 at the end part of the resilient deflectible arms 337 with the cam pieces 338 and may be turned along the peripheral direction within the extent of the recesses 334.

The operating pieces 341 are engaged with engaging projecting pieces 338a provided to the cam pieces 338 to prevent incidental extrication thereof towards above.

When only one side of the small size disk 325 is formed as the signal record surface 325c, similarly to the above described optical disk, the small size disk 325 may be attached to the optical pickup device within the disk player only in one attachment orientation. Thus the one side 326a of the disk supporting member 326 is designed as the mirror surface having the appearance same as that of the signal record surface 325c of the disk 325, while on the other side 326b it is designed as a printed surface bearing printed handling instructions similarly to the printed surface 325e of the disk 325.

It is noted that any other indicating means may be used for clarifying the attachment orientation of the small size disk 325.

The operation of holding the small size disk 325 by the above described apparatus for adapting the disk diameter is hereafter explained.

Figure 39:
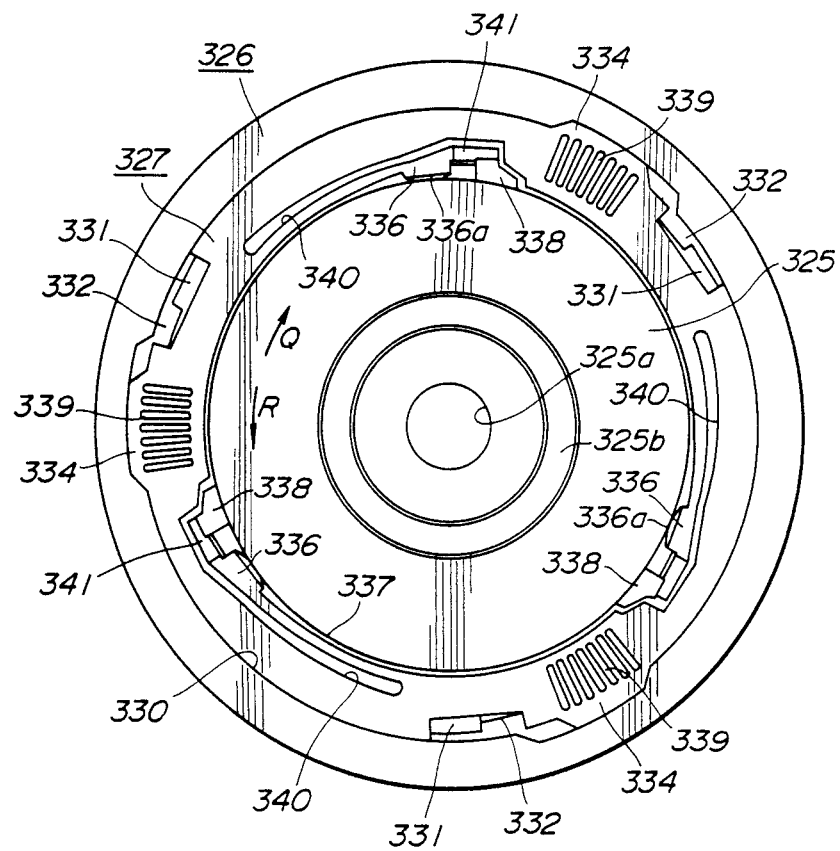
FIG. 39 is a plan view illustrating a state of a small size disk being held by the apparatus for adapting the diameter of a disklike recording medium according to the present invention.

For holding the small size disk 325 in the above described manner, the disk holding member 327 is turned in the direction of the arrow mark R as shown in FIG. 39 to cause the operating piece 341 at the end part of the resilient deflectible arm 337 to ride on the cam piece 338 to cause the resilient deflectible arm 337 to be turned and offset outwardly of the disk supporting member 326 to retract the disk holding piece 336 inwardly of the disk supporting member 326. In this state, the small size disk 325 is placed on the disk supporting member 326 with the outer periphery 325d thereof engaged with and retained on the disk supporting piece 329. The disk holding member 327 is then turned in the direction of the arrow mark Q in FIG. 39 with finger pressure applied to the grooves 339 formed in each of the rotation control recesses 334. When the disk holding member 327 is turned in this manner, the boss 341a of the operating piece 341 is disengaged from the cam pieces 338 to cause the resilient deflective arm 337 to be turned by spring action back towards the inner periphery of the disk supporting member 326 to cause the disk holding piece 336 to be protruded into the disk fitting opening 328. With the disk holding piece 336 projected in this manner, the small size disk 325 has its outer periphery 325d clamped by the disk supporting piece 329 of the disk supporting member 326 and by the disk holding piece 336, as shown in FIGS. 40 and 42, so as to be retained within the fitting opening 328 of the disk supporting member 326.

With the small size disk 325 thus retained and made as one with the disk supporting member 326, the diameter of the small size disk 325 may be assimilated, with the outside diameter of the supporting member 326, so that the resulting assembly is equivalent with the optical disk 2 having the unified size or diameter and thus may be handled in the same manner as the aforementioned optical disk.

The foremost parts of the disk holding pieces 336 are formed with bent guide pieces 329 to smooth the operation of holding the the small size disk 325.

Within the recess 335 of the disk supporting member 326 for regulating the rotation of the disk holding member 327, there are formed projections 345 adapted for engaging with the grooves 339 when the small size disk 325 is held therein to regulate the rotation of the disk holding member 327.

In the present embodiment, the operating pieces 341 are provided to the foremost parts of the resilient deflective arms 337 and engaged with the cam pieces 338. Alternatively, however, the operating pieces 341 may be omitted and the intermediate portions of the resilient deflective pieces 337 may be engaged with the cam pieces 338 to cause the arms 337 to be turned and deflected towards the inside and the outside of the disk supporting member 326.

In the foregoing embodiments, description has been made by taking an example of an optical disk. However, the present invention is not limited to the optical disk, but may be extensively applied to an opto-magnetic disk or to a magnetic disk wherein it is necessary to unify the disk to a predetermined diameter.

The outside diameter of the supporting member for the recording medium and the diameter of the disk fitting opening can be changed to suit to the unified disk diameter or to the diameter of the disk supported in the disk holding member.

From the foregoing it is seen that the present invention provides an arrangement in which a disk-like recording medium of a variable size can be held on the inner periphery of a holder having a unified outside diameter so that the recording medium of a variable size can be adapted to the same diameter as that of the recording medium of the unified size or diameter. Consequently, a small size disk can be handled in a same way as a disk of the predetermined size by the present apparatus having the unified predetermined outside diameter so that the small size disk can be loaded to conventional extensively employed disk players.

Also, in accordance with the present invention, the disk-like recording medium of variable size can be loaded to one and the same disk player for recording and/or reproduction by the same mode of handling and without changing the loading unit.

What is claimed is:

1. An apparatus for adapting the diameter of a disk-like recording medium, comprising a holder having a diameter larger than that of the disk-like recording medium, said holder being formed as a solid ring concentric with a center of rotation of the disk-like recording medium when the disk-like recording medium is held therein and so as to hold a non-signal record area on the outer periphery of the disk-like recording medium integrally therewith and so as to allow signals recorded on the disk-like recording medium to be read out when the disk-like recording medium is held by said holder and said solid-ring including means for forming an expandable central opening so that said holder is mountable to and dismountable from the disk-like recording medium.

2. The apparatus according to claim 1, wherein said holder is formed of synthetic material.

3. The apparatus according to claim 1, wherein said holder has one side formed as a printable surface bearing printed information so as to be matched with a non-signal record surface of the disk-like recording medium held thereby.

4. The apparatus according to claim 3, wherein the printed information on said printable surface corresponds to signals recorded on a signal record surface of the disk-like recording medium.

5. The apparatus according to claim 3, wherein said holder has another side provided so as to have properties equivalent to those of a signal record surface of the disk-like recording medium.

6. The apparatus according to claim 1, wherein the disk-like recording medium is an optical disk having an optical recording medium.

7. The apparatus according to claim 6, wherein said holder has one side provided with optical properties equivalent to those of a signal record surface of the optical disk.

8. The apparatus according to claim 6, wherein said one side of said holder is provided with the same optical properties as those of a non-signal record area of a signal recording surface of the optical disk.

9. The apparatus according to claim 7, wherein said holder has an other side formed as a printed surface bearing printed information so as to be matched with a non-signal record surface of the disk-like recording medium held thereby.

10. The apparatus according to claim 9, wherein the printed information formed on said printed surface corresponds to signals recorded on a signal recording surface of the disk-like recording medium.

11. The apparatus according to claim 1, wherein said holder is provided with resiliently deflectable holding means for holding the disk-like recording medium integrally therewith.

12. The apparatus according to claim 11, wherein said holder is provided with an opening concentric with the center of the disk-like recording medium when held by said holder so that the signal record area of the disk-like recording medium is exposed through said opening.

13. The apparatus according to claim 12, wherein said opening is provided so as to totally expose the signal record area of the disk-like recording medium at least when the recording medium is held in said holder.

14. The apparatus according to claim 12, wherein said holding means includes a holding member for the disk-like recording medium in the form of a resilient ring arranged on the perimeter of said opening.

15. The apparatus according to claim 12, wherein said holding member has an inner perimeter provided with a groove into which the outer perimeter of the disk-like recording medium is fittable.

16. The apparatus according to claim 15, wherein said holding member has an outer perimeter formed with a pair of clamping pieces having a plurality of engaging projections, said holder having a plurality of mating engaging openings corresponding to said engaging projections, and said holding member being mountable to said holder by engaging said engaging projections in said plurality of mating engaging openings provided in said holder.

17. The apparatus according to claim 14, wherein said holding member is formed of a rubbery synthetic material.

18. The apparatus according to claim 1, wherein said holder is provided with holding means for the disk-like recording medium, said holding means including resilient thrusting sections resiliently deflectable radially of the disk-like recording medium held thereby.

19. The apparatus according to claim 18, wherein said holder is provided with an opening concentric with the center of the disk-like recording medium being held in said holder, said disk-like recording medium being held in said opening by said thrusting sections so as to be substantially flush with said holder, a signal record area of said disk-like recording medium being outwardly exposed through aid opening.

20. The apparatus according to claim 19, wherein said opening is adapted so as to totally expose the signal record area of the disk-like recording medium at least when the recording medium is held therein.

21. The apparatus according to claim 19, wherein a plurality of said resilient thrusting sections are formed radially from the center of said opening at equiangular intervals from one another.

22. The apparatus according to claim 1, wherein said holder comprises a supporting member for the disk-like recording medium which is shaped so that the disk-like recording medium is placeable thereon, and clamping members for the disk-like recording medium mounted to said supporting member and provided so as to clamp the disk-like recording medium in cooperation with said supporting member.

23. The apparatus according to claim 22, wherein said clamping members are provided so as to be removably mounted to said supporting member.

24. The apparatus according to claim 23, wherein said supporting member and said clamping members each have a thickness substantially the same as that of the disk-like recording medium when the recording medium is clamped thereby.

25. The apparatus according to claim 23, wherein said supporting member is provided with an opening concentric with the center of the disk-like recording medium when in the clamped state, said opening being provided so that the disk-like recording medium is positionable therein and so that a signal record area of the disk-like recording medium is outwardly exposed.

26. The apparatus according to claim 25, wherein said opening is so formed as to totally expose the signal record area of the disk-like signal recording medium at least when the signal recording medium is clamped.

27. The apparatus according to claim 25, wherein supporting pieces are provided on said supporting member so as to protrude from one side of said supporting member into said opening.

28. The apparatus according to claim 27, wherein said clamping members are provided with clamping pieces which cooperate with said supporting pieces to clamp the disk-like recording medium.

29. The apparatus according to claim 27, wherein said supporting pieces are provided so as to support a non-signal record area on the outer periphery of the disk-like recording medium.

30. The apparatus according to claim 24, wherein said supporting member is provided with a step having a level difference equivalent to the thickness of said clamping members mounted thereto.

31. The apparatus according to claim 28, wherein resilient thrusting sections resiliently deflectable radially of said opening are provided on said supporting member so as to thrust the outer periphery of the disk-like recording medium.

32. The apparatus according to claim 31, wherein said resilient thrusting sections are each formed by a pair of radial slits formed radially form the periphery of said opening and a peripheral slit formed between and near the end parts of said radial slits.

33. The apparatus according to claim 32, wherein thrust projections are provided at substantially the center of said thrusting sections so as to protrude inwardly of said opening.

34. The apparatus according to claim 23, wherein engaging means are provided to said clamping members and mating engaging means are provided to said supporting member so as to engage with said engaging means, said clamping members being mounted to said supporting member by engagement of said engaging means with said mating engaging means.

35. The apparatus according to claim 34, wherein said mating engaging means of said supporting member includes a plurality of fitting openings and wherein said engaging means of said clamping members includes fitting pieces having engaging projecting pieces provided so as to be engagable with the perimeter of each respective fitting opening.

36. The apparatus according to claim 35, wherein said engaging means further include a cut-out provided so as to permit resilient deflection of said fitting pieces, said engaging pieces being provided so as to protrude into said cut-out so as to engage with the perimeter of each respective fitting opening.

37. The apparatus according to claim 36, wherein finger rest means are provided on said clamping members at said fitting pieces so as to permit resilient deflection of said fitting pieces.

38. The apparatus according to claim 23, wherein said supporting member and said clamping member are provided with marks so as to indicate a mounting position thereof.

39. The apparatus according to claim 34, wherein said engaging means and said mating engaging means are formed so as to be engagable with each other by relative rotation between said clamping and supporting members in a prescribed direction.

40. The apparatus according to claim 39, wherein said engaging means includes a plurality of projecting pieces provided to said clamping members, said mating engaging means including mating engaging grooves provided in said supporting member so that said projecting pieces are engagable therein.

41. The apparatus according to claim 40, wherein said mating engaging grooves are formed with rotational guide openings for guiding said projecting pieces.

42. The apparatus according to claim 40, wherein proximate parts of said engaging projecting pieces of said clamping members are formed with slits to permit resilient deflection of said engaging projecting pieces.

43. The apparatus according to claim 39, wherein rotation guide pieces are provided to the outer periphery of said clamping members and wherein said supporting member is provided with grooves arranged so as to limit the rotational extent of said rotating guide pieces.

44. The apparatus according to claim 40, wherein said clamping members are provided with marks for indicating the rotational position of said engaging projecting pieces and wherein said supporting member is provided with indicia showing non-lock and lock positions of said projecting pieces in said mating engaging grooves.

45. The apparatus according to claim 1, wherein said holder includes a supporting member shaped so as to support the disk-like recording medium thereon and a holding member for the disk-like recording medium rotatably mounted to said supporting member and adapted to be rotatable with respect to said supporting member to hold the recording medium.

46. The apparatus according to claim 45, wherein said supporting member and said holding member each have a combined thickness substantially equal to the thickness of the recording medium when the recording medium is held therein.

47. The apparatus according to claim 45, wherein said supporting member is provided with an opening concentric with the center of the disk-like recording medium when the recording medium is held therein, said opening being formed so that the recording medium is positionable therein and so that a signal record area of the disk-like recording medium is outwardly exposed.

48. The apparatus according to claim 47, wherein said opening is formed so that the signal record area of the disk-like recording medium is totally exposed to outside at least when the recording medium is held therein.

49. The apparatus according to claim 47, wherein said holding member is formed as a ring.

50. The apparatus according to claim 47, wherein supporting pieces for the disk-like recording medium are provided so as to project form one side of said supporting member towards the inside of said opening.

51. The apparatus according to claim 50, wherein said holding member is formed with a plurality of arms which extend towards the inside of said opening so as to hold the disk-like recording medium in cooperation with said supporting pieces when said holding member is turned with respect to said supporting member in a predetermined direction.

52. The apparatus according to claim 51, wherein said arms are resiliently deflectable by cam pieces provided to said supporting member so as to project into the inside of said opening.

53. The apparatus according to claim 52, wherein said holding member is formed with a plurality of engaging pieces and wherein rotation operating pieces having protuberances are formed at the ends of said arms, a plurality of pairs of clamping pieces being provided to said supporting member so as to clamp said engaging pieces, said cam pieces being provided with engaging projecting pieces, said rotation operating pieces being engagable with said projecting pieces of said cam pieces, said engaging pieces being clamped by said clamping pieces so as to mount said holding member to said supporting member.

54. The apparatus according to claim 53, wherein said holding member is provided with rotation guide pieces and wherein said supporting member is formed with grooves in which said rotation guide pieces are engagable to limit the rotational extent of said holding member.

55. The apparatus according to claim 45, wherein said holding member is provided with finger rest means for facilitating manual rotation thereof with respect to said supporting member.

56. The apparatus according to claim 55, wherein said finger rest means includes a plurality of recesses.

57. The apparatus according to claim 56, wherein said holding member of said supporting member has a slide contact surface formed with protuberances for engaging with said recesses so as to limit the rotational extent of said holding member relative to said supporting member.

58. The apparatus according to claim 45, wherein said holding member is a punched metal plate.

59. The apparatus according to claim 45, wherein said holding member is a punched stainless steel plate.

60. The apparatus according to claim 45, wherein said supporting member is formed of a synthetic material.

61. The apparatus according to claim 22, wherein said supporting member is formed of a synthetic material.

62. The apparatus according to claim 22, wherein said clamping members are formed of a synthetic material.

63. The apparatus according to claim 50, wherein said supporting pieces are formed so as to support a non-signal record area on the outer periphery of the disk-like recording medium.

64. An apparatus for adapting the diameter of a disk-like recording medium, comprising a holder having a diameter larger than that of the disk-like recording medium, said holder being formed so as to hold the disk-like recording medium integrally therewith and so as to allow signals recorded on the disk-like recording medium to be read out when the disk-like recording medium is held by said holder, said holder being provided with holding means for holding the disk-like recording medium, said holding means including resilient-thrusting sections resiliently deflectable radially of the disk-like recording medium held thereby, wherein said thrusting sections are each formed by a pair of radial slits extending radially outwardly from said opening and a peripheral slit extending between near the end parts of said radial slits, wherein said holder is further provided with an opening concentric with the center of the disk-like recording medium being held in said opening by said thrusting sections so as to be substantially flush with said holder with a signal record area of said disk-like recording medium being totally outwardly exposed through said opening.

65. The apparatus according to claim 64, wherein a fitting groove into which the outer perimeter of the disk-like recording medium is fittable is provided at the center of said resilient thrusting section.

66. The apparatus according to claim 65, wherein said resilient thrusting section includes a resilient arm having a surface formed with finger rest means for causing radial resilient deflection of said resilient arm.

67. The apparatus according to claim 64, wherein opposing surfaces of said radial and peripheral slits are formed with closure means for closing said radial and peripheral slits.

68. The apparatus according to claim 67, wherein said closure means includes a step.

69. The apparatus according to claim 64, wherein said holding means include supporting tongues extending from one side of said holder towards the interior of said opening.

70. The apparatus according to claim 69, wherein said supporting tongues are provided so as to be spaced apart.

71. The apparatus according to claim 70, wherein said holding means further includes thrusting tongues protruding in a space between adjacent supporting tongues and from an other side of said holder into the interior of said opening so as to thrust the disk-like recording medium towards said supporting tongues.

72. The apparatus according to claim 71, wherein said thrusting supporting tongues for thrusting the disk-like recording medium towards said supporting tongues are provided substantially at the center of said resilient thrusting sections.

73. The apparatus according to claim 72, wherein closure means for closing said radial and peripheral slits are provided on said holder so as to extend from the one side of side holder.

74. The apparatus according to claim 73, wherein finger rest means for causing resilient deflection of said resilient thrusting sections are provided on a surface of said resilient thrusting sections.

75. The apparatus according to claim 69, wherein said supporting tongues are formed so as to support the non-record area on the outer periphery of the disk-like recording medium.

* * * * *

UNITED STATES PATENT AND TRADEMARK OFFICE
CERTIFICATE OF CORRECTION

PATENT NO. : 4,837,784
DATED : June 6, 1989
INVENTOR(S) : Eiji Yamamori

It is certified that error appears in the above-identified patent and that said Letters Patent is hereby corrected as shown below:

In the Abstract, line 1, change "Described is an" to --An-- line 4, change "the" to --a--

Col. 2, line 20, after "R3" delete ";"

Figure 1:
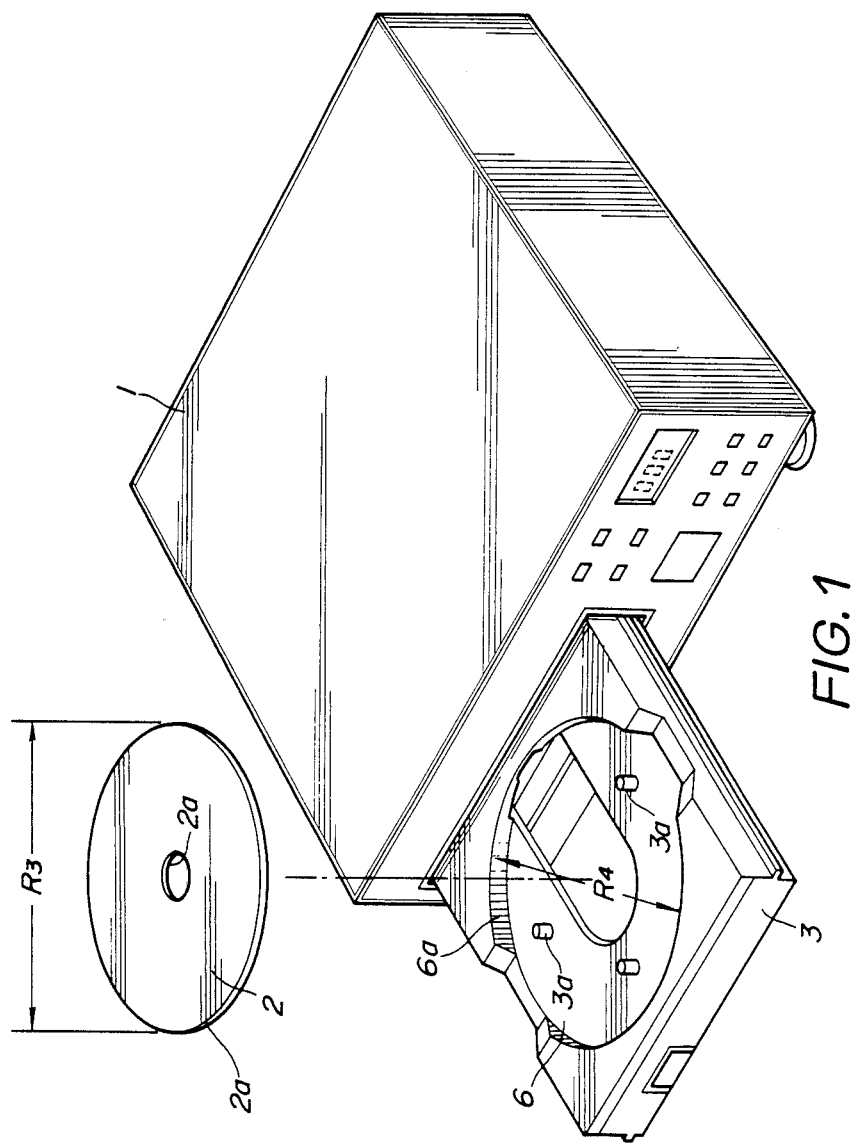
FIG. 1 is a perspective view of a known dish player having a disk transfer table.
Figure 2:
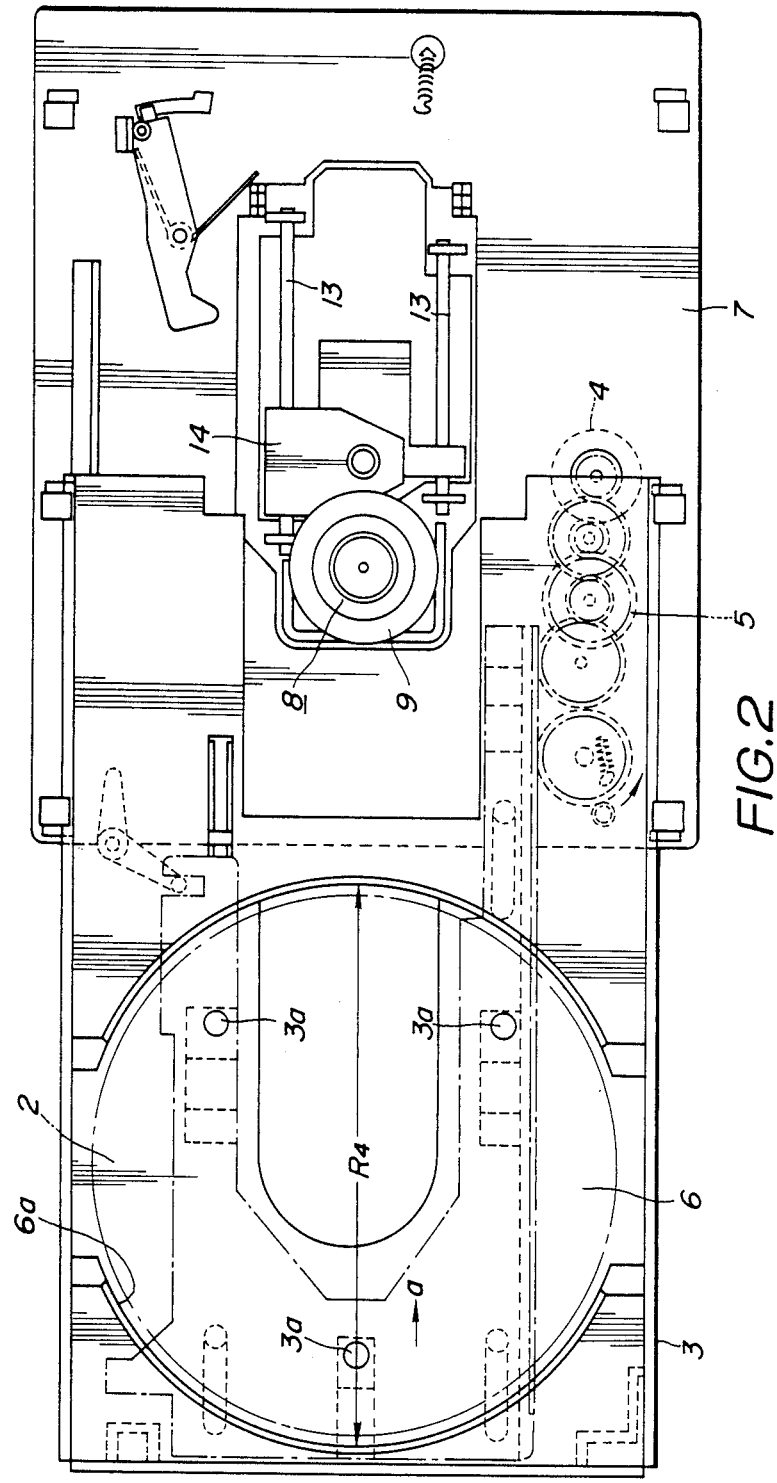
FIG. 2 is a plan view showing the inside structure of the disk player of FIG. 1.
Figure 3:
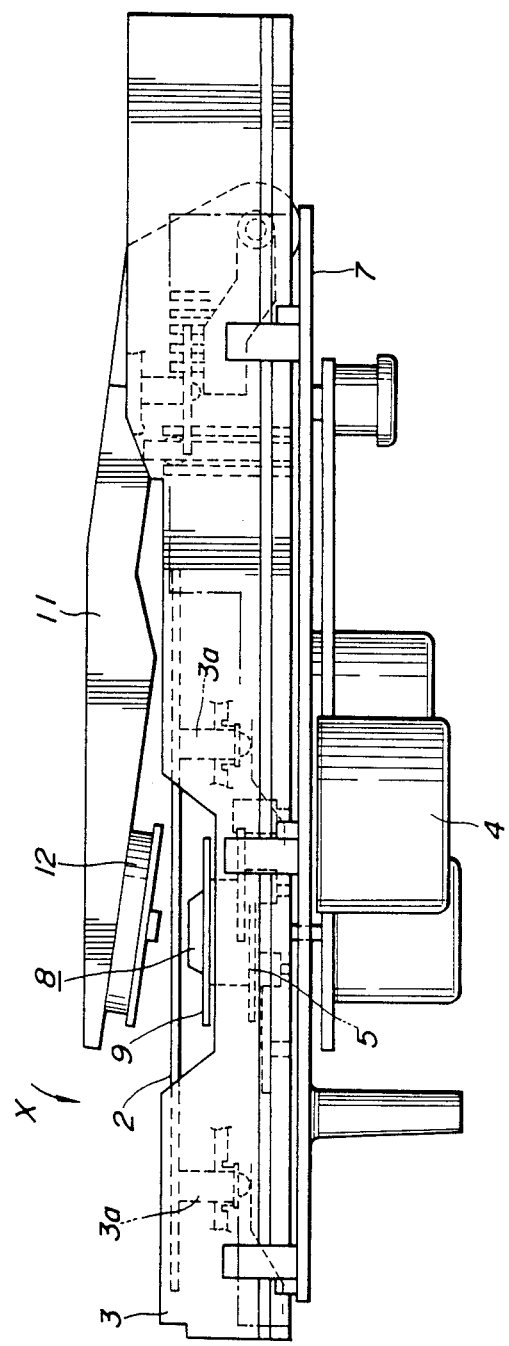
FIG. 3 is a side view illustrating a state of a clamping operation of an optical disk.
Figure 4:
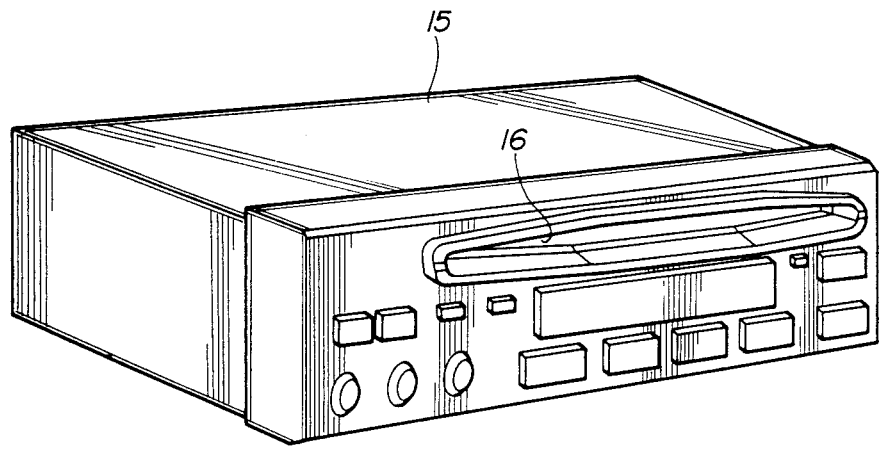
FIG. 4 is a perspective view of another known disk player wherein a loading operation of an optical disk is accomplished by a pair of rolls.
Figure 5:
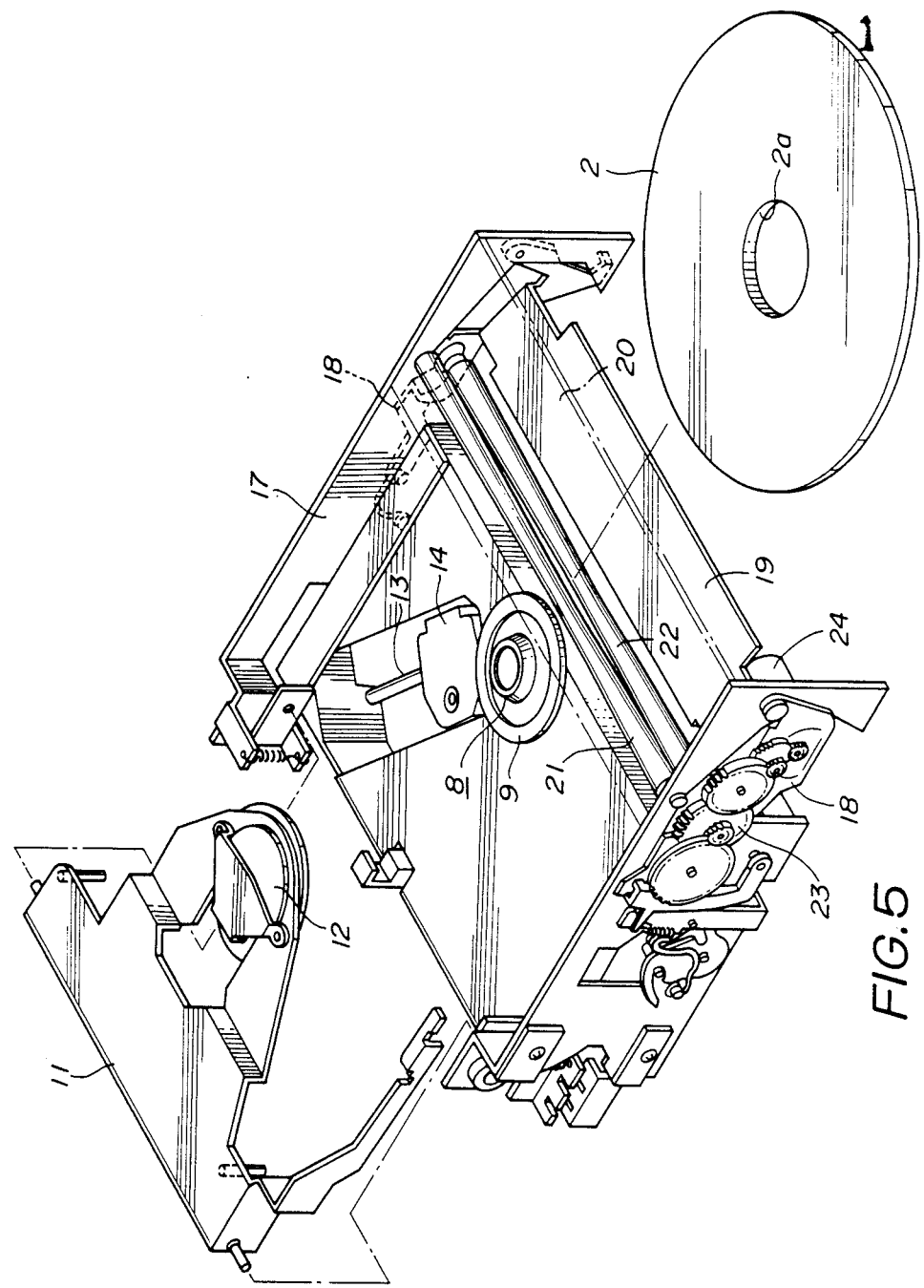
FIG. 5 is a perspective view showing the inside structure of the disk player of FIG. 4.

Col. 4, line 57, change "Fig. 1" to --Fig. 11--

Figure 6:
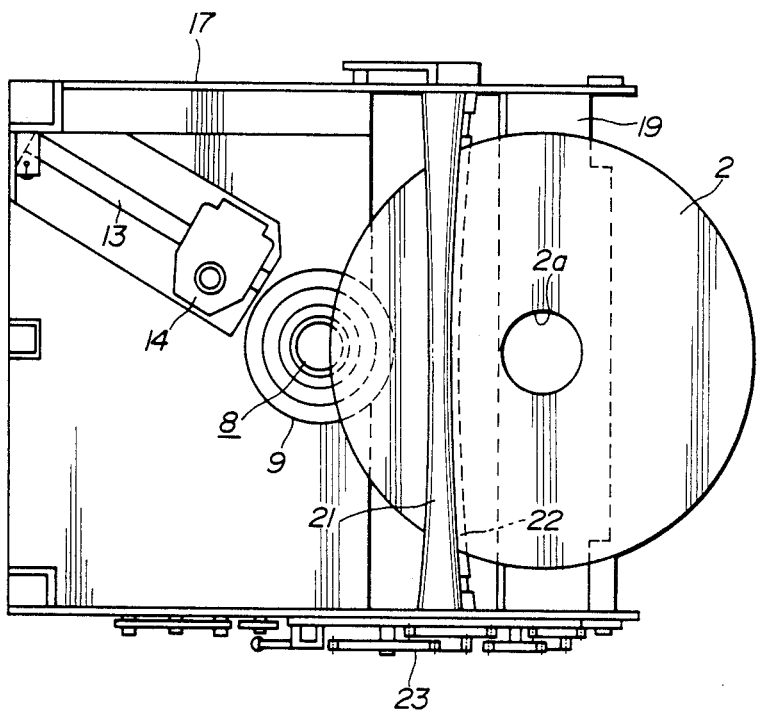
FIG. 6 is a plan view showing a state of a loading operation of the optical disk.

Col. 5, line 4, change "Fig 6" to --Fig. 16-- line 32, after "and" second occurence insert --a-- line 48, change "disklike" to --disk-like-- line 62, change "wil" to --will--

Col. 6, line 2, change "socalled" to --so-called-- line 13, change "the" to --a--

Col. 7, line 34, change "146b1" to --146b--

Col. 8, line 68, delete "the" third occurence

Col. 10, line 30, change "or one" to --of the-- same line, change "portion" to --portions--

Col. 11, line 6, after "used" insert --conventional so-called compact disk having the unified disk--line 7, delete "a" second occurence

UNITED STATES PATENT AND TRADEMARK OFFICE
CERTIFICATE OF CORRECTION

PATENT NO. : 4,837,784  Page 2 of 3
DATED : June 6, 1989
INVENTOR(S) : Eiji Yamamori It is certified that error appears in the above-identified patent and that said Letters Patent is hereby corrected as shown below:

line 33, after "226" insert --,--

Col. 14, line 62, after "254" insert --,--

Col. 15, line 50, change "325bwhich" to --325b which-- line 57, after "disk" insert --,--

Col. 16, line 2, change "therefor" to --thereof--

Col. 17, line 58, after "assimilated" delete ","

IN CLAIMS:

Col. 18, line 54, change "solid-ring" to --solid ring--

Col. 19, line 66, change "said" second occurence to --the--

Col. 20, line 2, change "aid" to --said--

UNITED STATES PATENT AND TRADEMARK OFFICE
CERTIFICATE OF CORRECTION

PATENT NO. : 4,837,784

DATED : June 6, 1989

INVENTOR(S) : Eiji Yamamori

It is certified that error appears in the above-identified patent and that said Letters Patent is hereby corrected as shown below:

Col. 21, line 51, change "rotating" to --rotation--

Col. 22, line 18, change "form" to --from--

Signed and Sealed this

Twenty-first Day of May, 1991

Attest:

HARRY F. MANBECK, JR.

Attesting Officer

Commissioner of Patents and Trademarks